(12) United States Patent
Plant et al.

(10) Patent No.: US 11,620,472 B2
(45) Date of Patent: Apr. 4, 2023

(54) UNIFIED PEOPLE CONNECTOR

(71) Applicant: Citrix Systems, Inc., Ft. Lauderdale, FL (US)

(72) Inventors: Samuel Christopher John Plant, Cambridge (GB); Nathan Alexander Burn, Cambridge (GB); John Matthew Dilley, Longstanton (GB); Ellen Rose Wootten, Bury St. Edmunds (GB); Nilpa Madhusudan Shah, Cambridge (GB)

(73) Assignee: Citrix Systems, Inc., Ft. Lauderdale, FL (US)

( * ) Notice: Subject to any disclaimer, the term of this patent is extended or adjusted under 35 U.S.C. 154(b) by 323 days.

(21) Appl. No.: 16/856,430

(22) Filed: Apr. 23, 2020

(65) Prior Publication Data

US 2021/0334589 A1    Oct. 28, 2021

(51) Int. Cl.
*G06F 16/00* (2019.01)
*G06K 9/62* (2022.01)
(Continued)

(52) U.S. Cl.
CPC .......... *G06K 9/6256* (2013.01); *G06F 9/542* (2013.01); *G06F 16/24578* (2019.01);
(Continued)

(58) Field of Classification Search
None
See application file for complete search history.

(56) References Cited

U.S. PATENT DOCUMENTS 8,620,842 B1    12/2013  Cormack
10,776,366 B1*   9/2020  Astretsov .......... G06F 16/24578
(Continued)

FOREIGN PATENT DOCUMENTS

CN    106850417 A    6/2017
CN    107958317 A    4/2018
(Continued)

OTHER PUBLICATIONS

International Search Report dated Mar. 8, 2021 for International Patent Application PCT/CN2020/095109, 4 pages.
(Continued)

*Primary Examiner* — Hasanul Mobin

(57) ABSTRACT

Systems and methods for identifying individuals with a user-requested expertise are provided. For example, the system can include a processor configured to receive a user input and extract one or more keywords from the input. The processor can generate search requests based upon the one or more keywords, each search request identifying at least one application programming interface (API) call configured to invoke at least one API function as exposed by a software application. The processor can transmit the search requests to the software applications and receive search responses. The processor can determine a plurality of software application users and a set of associated evidence, each set of associated evidence including user interactions with each of the software applications. The processor can aggregate the evidence into an aggregated data set and configure the aggregated data set as an input to a machine learning classifier for ranking the sets of evidence.

21 Claims, 14 Drawing Sheets

(51) Int. Cl.
 *G06N 20/00* (2019.01)
 *G06F 16/9535* (2019.01)
 *G06F 16/2457* (2019.01)
 *G06F 9/54* (2006.01)
 *G06N 3/04* (2023.01)

(52) U.S. Cl.
 CPC ....... *G06F 16/9535* (2019.01); *G06K 9/6262* (2013.01); *G06N 3/0445* (2013.01); *G06N 20/00* (2019.01)

(56) References Cited

U.S. PATENT DOCUMENTS

| | | |
|---|---|---|
| 11,113,617 B1 | 9/2021 | Liu |
| 2005/0073958 A1 | 4/2005 | Atlas |
| 2007/0234102 A1 | 10/2007 | Fan |
| 2007/0282797 A1* | 12/2007 | Wang .................. G06F 16/9535 |
| 2008/0077558 A1* | 3/2008 | Lawrence ............. G06F 40/131 |
| 2008/0101244 A1 | 5/2008 | Liu |
| 2009/0187537 A1 | 7/2009 | Yachin |
| 2014/0114713 A1 | 4/2014 | Ben Simhon et al. |
| 2014/0317079 A1 | 10/2014 | Obernikhin |
| 2016/0110810 A1* | 4/2016 | Ashok .................... H04W 4/21 705/36 R |
| 2016/0110826 A1 | 4/2016 | Morimoto |
| 2016/0300194 A1 | 10/2016 | Cornelsen |
| 2016/0323398 A1 | 11/2016 | Guo |
| 2017/0206478 A1 | 7/2017 | Deshpande |
| 2017/0213179 A1 | 7/2017 | Schissel |
| 2017/0270115 A1 | 9/2017 | Cormack |
| 2017/0270456 A1 | 9/2017 | Branagh et al. |
| 2017/0344954 A1 | 11/2017 | Xu |
| 2018/0046520 A1 | 2/2018 | Baughman |
| 2018/0239830 A1 | 8/2018 | Dialani et al. |
| 2018/0246983 A1* | 8/2018 | Rathod .............. G06F 16/9566 |
| 2019/0102704 A1 | 4/2019 | Liu |
| 2019/0108217 A1 | 4/2019 | Chen |
| 2019/0197427 A1 | 6/2019 | Hwang |
| 2020/0074311 A1 | 3/2020 | Li |
| 2020/0084123 A1 | 3/2020 | Kline |
| 2020/0287736 A1 | 9/2020 | Zhuk |
| 2020/0327005 A1* | 10/2020 | Singh .................. G06F 11/0709 |
| 2021/0035116 A1 | 2/2021 | Berrington |
| 2021/0042366 A1* | 2/2021 | Hicklin ................. G06Q 10/10 |
| 2021/0051121 A1 | 2/2021 | Menon |
| 2021/0117928 A1 | 4/2021 | Gupta |
| 2021/0273965 A1* | 9/2021 | Pi .......................... G06F 21/566 |
| 2021/0280195 A1 | 9/2021 | Srinivasan |

FOREIGN PATENT DOCUMENTS

| | | |
|---|---|---|
| CN | 110298639 A | 10/2019 |
| CN | 111754121 A | 10/2020 |
| WO | 2020106481 A1 | 5/2020 |

OTHER PUBLICATIONS

Written Opinion dated Mar. 8, 2021 for International Patent Application PCT/CN2020/095109, 4 pages.
Topic Model, Retrieved from "https://en.wikipedia.org/w/index.php?title=Topic_model&oldid=963465133", downloaded Jul. 14, 2020, 6 pages.
Profiling (information science), Retrieved from "https://en.wikipedia.org/w/index.php?title=Profiling_(information_science)&oldid=954888702", downloaded Jul. 14, 2020, 7 pages.
Dijkstra'z algorithm, Retrieved from "https://en.wikipedia.org/w/index.php?title=Dijkstra%27s_algorithm&oldid=966262952", downloaded Jul. 14, 2020, 12 pages.
Satish et al, "Automated Bug Assignment in Software Maintenance Using Graph Databases" I.J. Intelligent Systems and Applications, 2018, 2, 27-36.
PCT International Search Report and Written Opinion for Application No. PCT/US2021/028633 dated Jul. 26, 2021, 14 pages.
Leif Jonsson et al., "Automated Bug Assignment: Ensemble-based Machine Learning in Large Scale Industrial Contexts", Empir Software Eng Manuscript, Sep. 10, 2015, 52 pages.

\* cited by examiner

Aggregated Data Set 400

| User ID Fields 402 | Evidence Fields 404 |
|---|---|
| John Doe (402a) | Email: john.doe@company.com<br>Email Status: Active<br>Coding History: Author 29, Reviewer 2<br>Chat ID: jdoe (404a) |
| Steve Jones (402b) | Email: steve.jones@company.com<br>Email Status: Inactive<br>Coding History: Author 2, Reviewer 26<br>Chat ID: sjones (404b) |
| Sam Johnson (402c) | Email: sam.johnson@company.com<br>Email Status: Active<br>Coding History: Author 8, Reviewer 1<br>Chat ID: sjohnson (404c) |
| Jane Smith (402d) | Email: jane.smith@company.com<br>Email Status: Inactive<br>Coding History: Author 14, Reviewer 11<br>Chat ID: jsmith (404d) |

FIG. 4

UNIFIED PEOPLE CONNECTOR

BACKGROUND

In an organization such as a corporation, it can be difficult for an individual to locate another individual they may need for specific undocumented knowledge. This can be especially difficult in an organization that is distributed across multiple geographic locations and time zones. Individuals therefore waste time searching for the right person to provide assistance which is inefficient and costly to the organization. Additionally, the quality of assistance received may be affected as an individual with inadequate background may be utilized by the assistance searcher while the most-knowledgeable workers remain unidentified.

SUMMARY

In at least one example, a computer system for identifying individuals with a user-requested expertise related to one or more software applications is provided. The computer system includes a memory, a network interface, and at least one processor coupled to the memory and the network interface. The at least one processor is configured to receive, via the network interface, a user input from a user, extract one or more keywords from the user input, generate one or more search requests based upon the one or more keywords, each search request of the one or more search requests identifying at least one application programming interface (API) call configured to invoke at least one API function as exposed by a software application of the one or more software applications, transmit the one or more search requests to the one or more software applications, receive one or more search responses from the one or more software applications, determine, from the one or more search responses, a plurality of software application users and a set of evidence associated with each application user of the plurality to application users, each set of evidence including user interactions with each of the one or more software applications, aggregate the sets of evidence into an aggregated data set, and configure the aggregated data set as an input to a machine learning classifier.

Implementations of the computer system can include one or more of the following features.

In the computer system, the at least one processor can be further configured to input a set of initial evidence weightings into the machine learning classifier to generate a trained classifier, the set of initial evidence weightings comprising at least one weight parameter for the set of evidence, input the aggregated data set into the trained classifier, and receive a ranked listing of the plurality of software application users from the trained classifier, the ranked listing generated by the trained classifier based upon the aggregated data set. In some examples of the computer system, the at least one processor can be further configured to process the ranked listing to produce a personalized response to the user input and transmit, via the network interface, the personalized response to the user. In some additional examples of the computer system, the at least one processor can be further configured to receive user feedback from the user regarding the personalized response, the user feedback comprising a user feedback score of one or more of the plurality of software application users included in the personalized response, generate an updated set of evidence weightings based upon the user feedback, and store the updated set of evidence weightings. In some other examples of the computer system, the at least one processor can be further configured to receive an updated user input from the user, generate an updated aggregated data set based upon the updated user input, input the updated set of evidence weightings into the trained classifier to generate a retrained classifier, input the updated aggregated data set into the retrained classifier, and receive an updated ranked listing of the plurality of software application users from the retrained classifier, the updated ranked listing generated by the retrained classifier based upon the updated aggregated data set. In some examples, the at least one processor can be further configured to monitor user telemetry data indicative of one or more interactions between the user and the personalized response, generate an updated set of evidence weightings based upon the user telemetry data, and store the updated set of evidence weightings. In some additional examples, the at least one processor can be further configured to receive an updated user input from the user, generate an updated aggregated data set based upon the updated user input, input the updated aggregated data set and the updated set of evidence weightings into the trained classifier, and receive an updated ranked listing of the plurality of software application users from the trained classifier, the updated ranked listing generated by the trained classifier based upon the updated aggregated data set and the updated set of evidence weightings.

In the computer system, the set of evidence associated with each of the plurality of software application users can include a listing of interactions between each of the plurality of software application users and the one or more software applications, each of the listing of interactions including information related to the one or more keywords.

In the computer system, the one or more software applications can include at least one of an email application, a chat application, a messaging application, a community forum application, a code generation and/or review application, an accounting application, and a word processing application.

In another example, a method of identifying individuals with a user-requested expertise related to one or more software applications is provided. The method includes receiving, by at least one processor, a user input from a user; extracting, by the at least one processor, one or more keywords from the user input; generating, by the at least one processor, one or more search requests based upon the one or more keywords, each search request of the one or more search requests identifying at least one API call configured to invoke at least one API function as exposed by a software application of the one or more software applications; transmitting, by the at least one processor, the one or more search requests to the one or more software applications; receiving, by the at least one processor, one or more search responses from the one or more software applications; determining, by the at least one processor, a plurality of software application users and a set of evidence associated with each application user of the plurality to application users from the one or more search responses, each set of evidence including user interactions with each of the one or more software applications; aggregating, by the at least one processor, the sets of evidence into an aggregated data set; and configuring, by the at least one processor, the aggregated data set as an input to a machine learning classifier.

Implementations of the method of identifying individuals with a user-requested expertise related to one or more software applications can include one or more of the following features.

In some examples, the method can further include inputting, by the at least one processor, a set of initial evidence weightings into the machine learning classifier to generate a trained classifier, the set of initial evidence weightings comprising at least one weight parameter for the set of evidence; inputting, by the at least one processor, the aggregated data set into the trained classifier; and receiving, by the at least one processor, a ranked listing of the plurality of software application users from the trained classifier, the ranked listing generated by the trained classifier based upon the aggregated data set. In some additional examples, the method can further include processing, by the at least one processor, the ranked listing to produce a personalized response to the user input and transmitting, by the at least one processor, the personalized response to the user.

In some examples, the method can further include receiving, by the at least one processor, user feedback from the user regarding the personalized response, the user feedback comprising a user feedback score of one or more of the plurality of software application users included in the personalized response; generating, by the at least one processor, an updated set of evidence weightings based upon the user feedback; inputting, by the at least one processor, the updated set of evidence weightings into the trained classifier to generate a retrained classifier; receiving, by the at least one processor, an updated user input from the user; generating, by the at least one processor, an updated aggregated data set based upon the updated user input; inputting, by the at least one processor, the updated aggregated data set into the retrained classifier; and receiving, by the at least one processor, an updated ranked listing of the plurality of software application users from the retrained classifier, the updated ranked listing generated by the retrained classifier based upon the updated aggregated data set.

In some examples, the method can further include monitoring, by the at least one processor, user telemetry data indicative of one or more interactions between the user and the personalized response; generating, by the at least one processor, an updated set of evidence weightings based upon the user telemetry data; storing, by the at least one processor, the updated set of evidence weightings; receiving, by the at least one processor, an updated user input from the user; generating, by the at least one processor, an updated aggregated data set based upon the updated user input; inputting, by the at least one processor, the updated aggregated data set and the updated set of evidence weightings into the trained classifier; and receiving, by the at least one processor, an updated ranked listing of the plurality of software application users from the trained classifier, the updated ranked listing generated by the trained classifier based upon the updated aggregated data set and the updated set of evidence weightings.

In the method, the set of evidence associated with each of the plurality of software application users can include a listing of interactions between each of the plurality of software application users and the one or more software applications, each of the listing of interactions including information related to the one or more keywords.

In another example, non-transitory computer readable medium storing computer executable instructions to identify individuals with a user-requested expertise related to one or more software applications is provided. The computer executable instructions include instructions to: receive a user input from a user; extract one or more keywords from the user input; generate one or more search requests based upon the one or more keywords, each search request of the one or more search requests identifying at least one API call configured to invoke at least one API function as exposed by a software application of the one or more software applications; transmit the one or more search requests to the one or more software applications; receive one or more search responses from the one or more software applications; determine, from the one or more search responses, a plurality of software application users and a set of evidence associated with each application user of the plurality to application users, each set of evidence including user interactions with each of the one or more software applications; aggregate the sets of evidence into an aggregated data set; and configure the aggregated data set as an input to a machine learning classifier.

Implementations of the computer readable medium can include one or more of the following features.

In some examples of the computer readable medium, the instructions can further include instructions to input a set of initial evidence weightings to the machine learning classifier to generate a trained classifier, the set of initial evidence weightings comprising at least one weight parameter for the set of evidence; input the aggregated data set into the trained classifier; and receive a ranked listing of the plurality of software application users from the trained classifier, the ranked listing generated by the trained classifier based upon the aggregated data set. In some additional examples, the instructions can further include instructions to process the ranked listing to produce a personalized response to the user input and transmit the personalized response to the user.

In some examples of the computer readable medium, the instructions can further include instructions to receive user feedback from the user regarding the personalized response, the user feedback comprising a user feedback score of one or more of the plurality of software application users included in the personalized response; generate an updated set of evidence weightings based upon the user feedback; input the updated set of evidence weightings into the trained classifier to generate a retrained classifier; receive an updated user input from the user; generate an updated aggregated data set based upon the updated user input; input the updated aggregated data set into the retrained classifier; and receive an updated ranked listing of the plurality of software application users from the retrained classifier, the updated ranked listing generated by the retrained classifier based upon the updated aggregated data set.

In some additional examples of the computer readable medium, the instructions can further include instructions to monitor user telemetry data indicative of one or more interactions between the user and the personalized response; generate an updated set of evidence weightings based upon the user telemetry data; store the updated set of evidence weightings; receive an updated user input from the user; generate an updated aggregated data set based upon the updated user input; input the updated aggregated data set and the updated set of evidence weightings into the trained classifier; and receive an updated ranked listing of the plurality of software application users from the trained classifier, the updated ranked listing generated by the trained classifier based upon the updated aggregated data set and the updated set of evidence weightings.

In some examples of the computer readable medium, the set of evidence associated with each of the plurality of software application users can include a listing of interactions between each of the plurality of software application users and the one or more software applications, each of the listing of interactions including information related to the one or more keywords.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

FIG. 4 illustrates a sample aggregated data set, in accordance with at least one example of the present disclosure.

DETAILED DESCRIPTION

Figure 1:
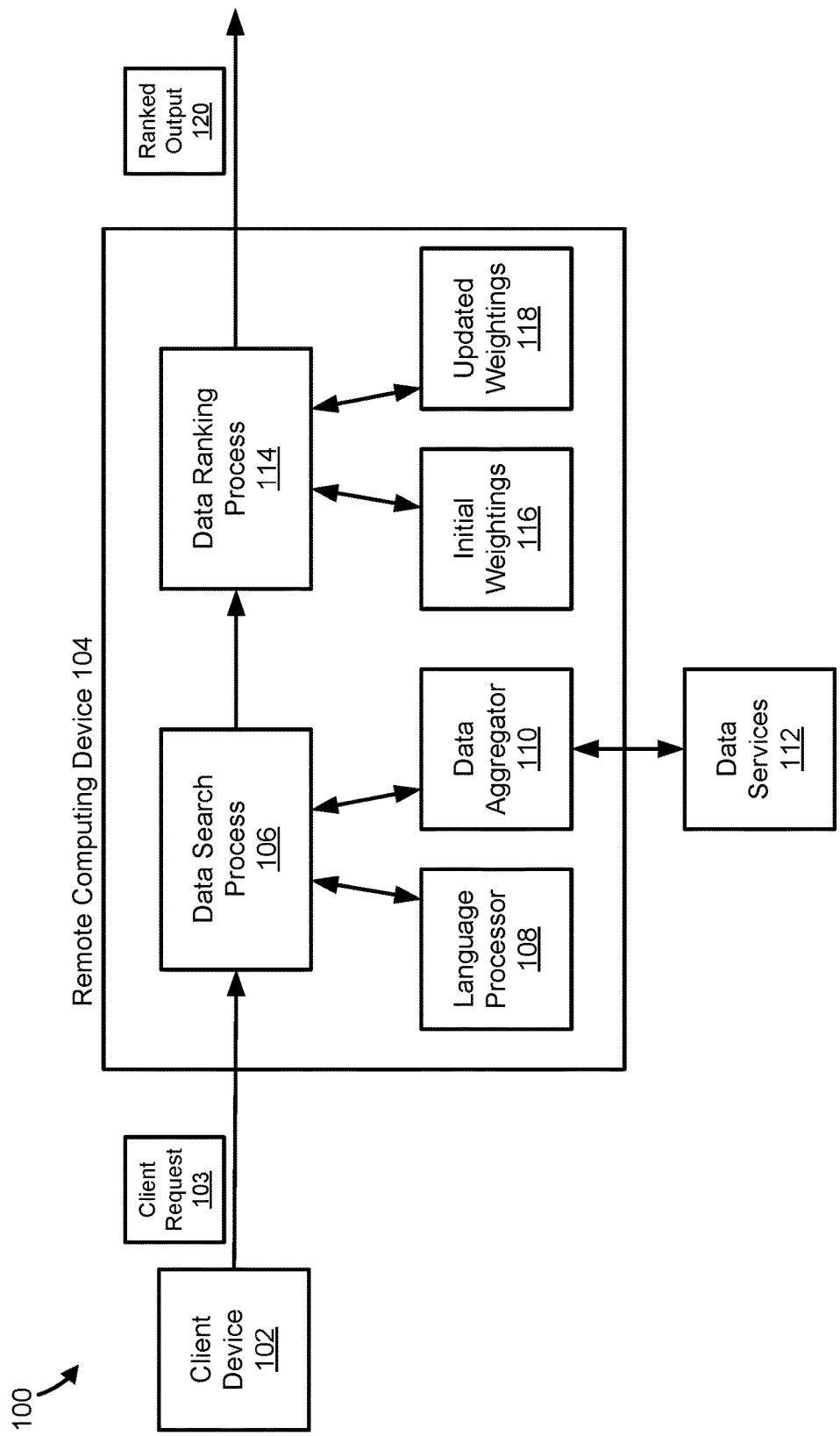
FIG. 1 is a block diagram of a help request system architecture, in accordance with at least one example of the present disclosure.

As summarized above, various examples described herein are directed to systems and methods for identifying individuals with a user-requested expertise such as, for example, expertise related to one or more software applications. These systems and methods overcome technical difficulties that arise in other techniques for identifying user expertise where, for example, a data aggregator cannot determine whether an application user has a particular expertise directed to one or more specific areas. For example, existing expertise identification systems are typically influenced by user ratings that are provided by the users themselves. This information would not provide an indication of a specific area of expertise a user may have, such as specific engineering knowledge, specific sales knowledge, specific customer service experience, specific billing software knowledge, and other similar areas of expertise.

To improve a user's experience with locating specific user-expertise in a distributed workspace environment, the system may include one or more data aggregation processes used to generate a list of recommended users that the requesting user may want to contact for specific assistance. The system can generate a list of recommended application users based upon aggregation of historic usage patterns for a set of application users. For example, generating the list or recommended application users can include searching specific interactions with one or more applications by the application users based upon keywords extracted from the requesting user's request for assistance. To improve on the search results, the system can use a data ranking process to rank the search results to improve the overall presentation and usability of the search results. For example, by using a set of evidence weightings to weigh one or more associated pieces of data in the search results, the search results can be ranked in a more useful manner for the requesting user.

Thus, and in accordance with at least some examples disclosed herein, help and assistance request systems, methods, and processes are provided that include improved searching and ranked search results generation in response to a user's request for assistance. These systems, methods, and processes enhance the quality of a user's experience by minimizing the time taken to return a set of results while improving the accuracy and reliability of the results.

In some examples, a processor associated with a server included in, for example, a distributed workspace system, can be configured to receive a help request from a requesting user. The processor can be further configured to extract one or more keywords from the help request using, for example, a natural language processor, and generate one or more search requests based upon the one or more keywords. Each of the search requests can specify and/or identify at least one API, or at least one API call, and invoke at least one particular API function as exposed by one or more software applications associated with the distributed workspace system. The processor can transmit the one or more search requests to the one or more software applications and receive one or more search responses from the applications. The processor can process the search responses to determine a plurality of software application users and a set of evidence associated with each software application user. Each set of evidence can include a listing of page references including user interactions with each of the one or more software applications. The processor can be further configured to aggregate the sets of evidence into an aggregated data set and use the aggregated data set as an input to a machine learning classifier for ranking of the sets of evidence.

As will be understood in view of this disclosure, the machine learning classifier can be used to rank the sets of evidence to produce a ranked listing of software application users for presenting to the requesting user. For example, the processor as described above can be configured to input the aggregated data set into the machine learning classifier that has been previously trained and verified using, for example, a set of initial evidence weightings. The initial evidence weightings can include at least one weight parameter for the set of evidence to be processed by the machine learning classifier as described herein. The processor can then receive a ranked listing of the plurality of software application users as an output of the machine learning classifier, the listing ranked based upon the aggregated data set and the initial evidence weightings.

In some examples, feedback from one user regarding the search process as described herein can be used to improve or enhance a user experience for another user. For example, the processor as described above can receive user feedback from a requesting user including a user score of one or more of the software application users included in the search results. The processor can analyze the feedback and generate an updated set of evidence weightings for future use with the machine learning classifier. For example, the processor can use the updated set of evidence weightings to retain the classifier to improve future performance of the machine learning classifier. In such an example, future uses of the machine learning classifier can include improved accuracy and reliability when producing ranked results based upon the updated evidence weightings.

Examples of the methods, systems, and processes discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Distributed Workspace System

In some examples, a distributed workspace system is configured to implement workspace and system access to remote users, thereby providing a central repository of applications, files, and other similar resources to a group of trusted users. A digital workspace can be implemented as a software framework designed to deliver and manage a user's applications, data, and desktops in a consistent and secure manner, regardless of the user's device or location. Digital workspaces enhance the user experience by streamlining and automating those tasks that a user performs frequently, such as approving expense reports, confirming calendar appointments, submitting helpdesk tickets, and reviewing vacation requests. A digital workspace allows users to access functionality provided by multiple enterprise applications—including "software as a service" (SaaS) applications, web applications, desktop applications, and proprietary applications—through a single interface.

FIG. 1 illustrates a logical architecture of one implementation of, for example, a distributed workspace system that is configured to connect users with experts that may be able to provide assistance or help to the users. As shown in FIG. 1, the sample system 100 includes a client device 102 and a remote computer device 104. The remote computing device can be configured to receive a client request 103 from the client device, process the client request using one or more of a data search process 106 and a data ranking process 114, and return a ranked output 120 to the client device.

More specifically, as shown in FIG. 1, the sample system 100 can include a client device 102 (e.g., one of client devices 902 as discussed in reference to FIG. 9 below) that is configured to run a distributed workspace client presented to the user as a user interface (e.g., similar to user interface screen 200 as discussed in reference to FIG. 2 below). The user can access the user interface to submit one or more requests for assistance as described herein. For example, in response to reception of the one or more requests for assistance, the client device 102 (or client application or agent running on the client device) can generate the client request 103. The client device 102 can be configured to format the client request 103 and transmit the client request 103 to a remote computing device 104. As described herein, the remote computing device (e.g., one of servers 906 as discussed in reference to FIG. 9 below) can be configured to execute one or more of the data search process 106 and the data ranking process 114 as described below.

As further shown in FIG. 1, the data search process 106 can include, or have access to, one or more additional processes configured to provide added functionality to the data search process when processing the client request 103. For example, the data search process 106 can access a natural language processor 108. The language processor 108 can be configured to parse the client request 103 and identify one or more keywords to search and return these keywords to the data search process 106. The data search process 106 can access a data aggregator 110 to perform a search of one or more data services 112 based upon the one or more identified keywords. The data aggregator 110 can use the identified keywords to search the one or more data services 112 for relevant results to the client request 103. The data aggregator 110 can aggregate the search results as received from the data services 112 and pass the search results to the data search process 106. The data search process 106 can format the search results and pass the search results to a data ranking process 114.

As shown in FIG. 1, the data ranking process 114 can include, or have access to, one or more additional software modules or applications configured to provide additional functionality to the data ranking process for organizing the search results for presentation to the requesting user. The data ranking process 114 can include, for example, a supervised machine learning process that has been trained to process and rank search result sets as described herein below. For example, the discussion of FIGS. 5, 6A, and 6B below provide additional detail regarding a sample machine learning process as described herein.

As further shown in FIG. 1, the data ranking process 114 can access a set of initial weightings 116. Using a machine learning classifier trained upon the initial weightings 116 as described herein below, the data ranking process 114 can process the search results and provide a ranked set of search results as output 120 to the client request 103. In certain implementations, if the data search process 106 and the data ranking process 114 have been previously accessed, the remote computing device 104 can include user feedback information received in response to the search process. In such an example, the data ranking process 114 can also access a set of updated weightings 118 that have been updated based upon the user feedback collected from user's that have previously accessed system 100. The remote computing device 104, or another similar computing device, can retrain the machine learning classifier using the updated weightings 118. The data ranking process 114 can process the search results, produce a set of organized and ranked search results, and transmit a ranked output 120 to, for example, the client device 102, for review on a client application or client agent by the requesting user.

As noted above, various components as shown in system 100 can be integrated in or implemented on various devices. For example, in certain implementations, each of data process 106 and data ranking process 114 can be implemented on the same computing device, e.g., remote computing device 104 as described above. In some examples, data search process 106 can be implemented on a first remote computing device while data ranking process 114 is implemented on a separate machine, e.g., a second remote computing device. In some examples, each process 106 and 114 can be implemented on the same remote computing device as their associated and accessed software applications or processes. For example, data search process 106 can be implemented on the same remote computing device as language processor 108 and data aggregator 110. However, in certain implementations, each process 106 and 114 can be implemented on a separate remote computing device as their associated and accessed software applications or processes. For example, data search process 106 can be implemented on a separate remote computing device as one or both of language processor 108 and data aggregator 110. As such, it should be noted that the sample architecture of system 100 as shown in FIG. 1 is provided by way of example only.

Figure 2:
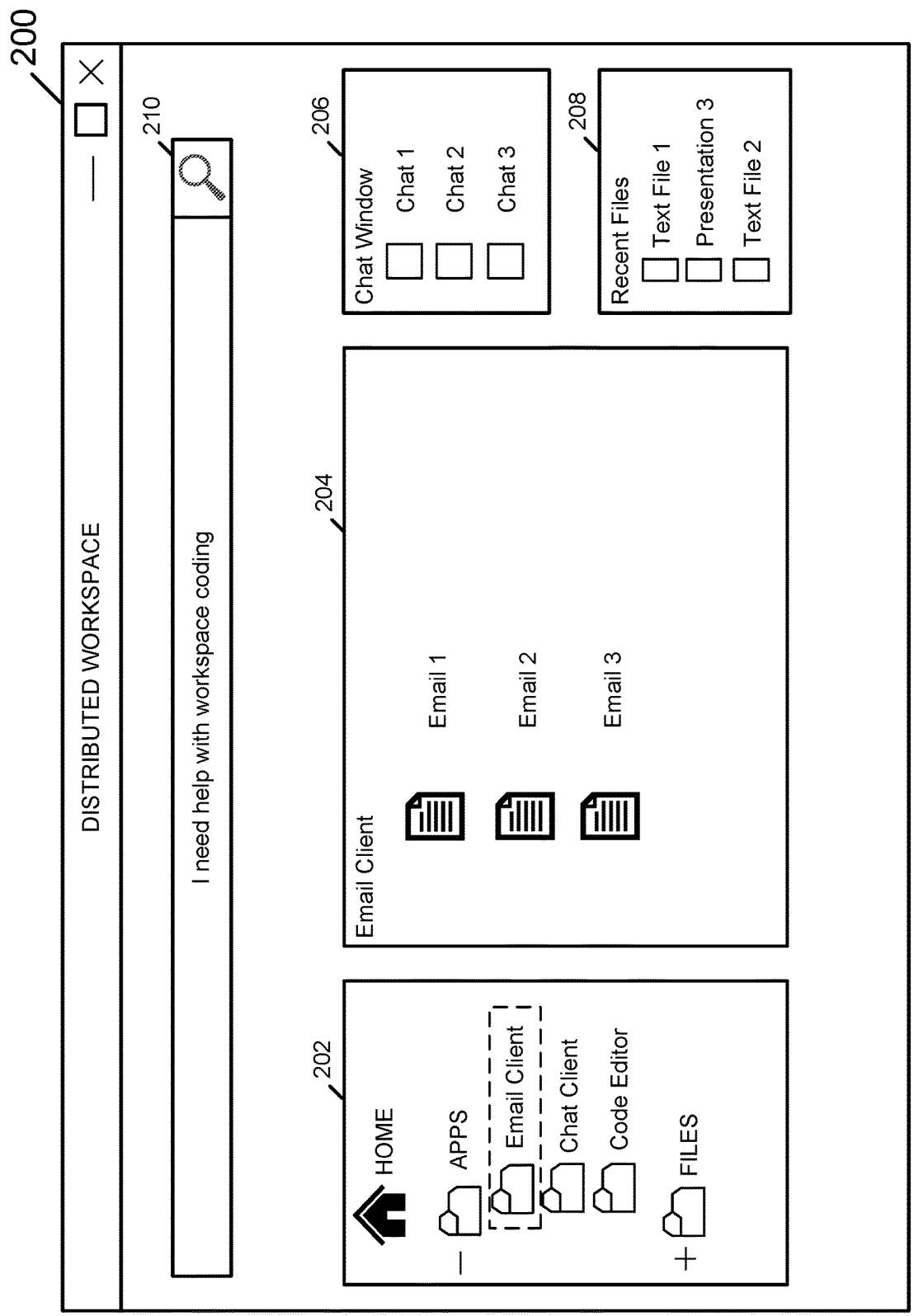
FIG. 2 is a sample user interface screen for accessing a distributed workspace including a help request search, in accordance with at least one example of the present disclosure.

FIG. 2 illustrates a sample view of a user interface screen 200 that is displayed on a client such as, for example, the client machine 102 as described above and managed by a client agent configured to manage access to remote resources hosted by, for example, remote computing device 104 as described above. The screen 200 can provide an interaction interface for the user to access various resources on a distributed workspace such as centrally located files, remote applications, digital interactions with remote users (e.g., chat, video conferencing, direct messaging, and other similar interactions), and other similar distributed resources.

As illustrated in FIG. 2, the screen 200 includes user interface controls 202, 204, 206, 208, and 210. In some examples, the control 202 provides access to an initial context for accessing one or more resources such as applications and remotely located files. For example, as shown in FIG. 2, control 202 can include a file navigation or explorer control that provides the user with a tool for navigating a tree structure configured to provide access to a set of applications and a file storage structure. In certain implementations, the control 202 can be illustrated as a hierarchal arrangement as shown in FIG. 2, with a first level showing a root classification of resources (e.g., applications, files) and a second level showing individual applications, folders, or other similar divisional structures. As shown in FIG. 2, the applications folder is expanded, showing an email client application, a chat client application, and a code editor application.

The control 204 can be a navigation resource window that works in concert with user interface control 202. In certain implementations, a processor that is configured to provide the interface control 202 can be configured to receive a user-selection of one or more resources as organized and displayed in control 204. For example, as shown in FIG. 2, the user has selected the email client application in the user interface control 202. The control 204 can update accordingly to show application-related resources such as a listing of available email messages. In this example, the control 204 can include and display three messages Email 1, Email 2 and Email 3 in the email client. The user can then select one of the messages as shown in the control 204 for access. In such an example, the control 204 can update to show additional detail about the user-selected message including options for, for example, responding to the message, accessing one or more attachments on the message, forwarding the message, and other similar messaging tasks. However, it should be noted that the control 204 is shown by way of example only and can include additional information depending upon the application running. For example, with an email client, the control 204 can further include additional features such as a folder listing (e.g., inbox, sent items, deleted items, and other similar email topic folders), search features, compose message options, and other similar features common in an email client application.

As further shown in FIG. 2, the screen 200 can also include the control 206, which is configured to show a listing of the user's most recent chat client interactions. For example, as shown in FIG. 2, the control 206 can be configured to show the three most recent chat interactions the user has participated in. It should be noted that three recent chat interactions are shown by way of example only in FIG. 2, and the number of recent chat interactions as shown in control 206 can vary based upon, for example, available space in the screen 200, user preference, system configuration, and other similar settings.

The screen 200, as shown in FIG. 2, also includes the control 208, which is configured to show a list of the most recently accessed files for a user. This list can include, for example, a number of the most recently accessed files for a particular user. Similar to control 206, it should be noted that three files are shown by way of example only in control 208.

As further shown in FIG. 2, the screen 200 can also include control 210, which is configured to provide a text entry box for receiving a query or help request from a user as described herein. For example, the user can access control 210 to enter a specific help request for a specific topic such as shown in FIG. 2. In response to entry of the help request, a processing system such as that described herein can execute a process to identify one or more users with expertise in the specific topic. When executing this process, the processing system can analyze the help request, identify one or more software application users who can provide assistance to the requesting user, rank the identified users, and provide a listing of the ranked users to the requesting user for review and potential follow-up. At least one example of such a process is described in greater detail below with reference to FIGS. 3A-3C, FIG. 5, and FIG. 7.

Sample Implementation Processes

Figure 3A:
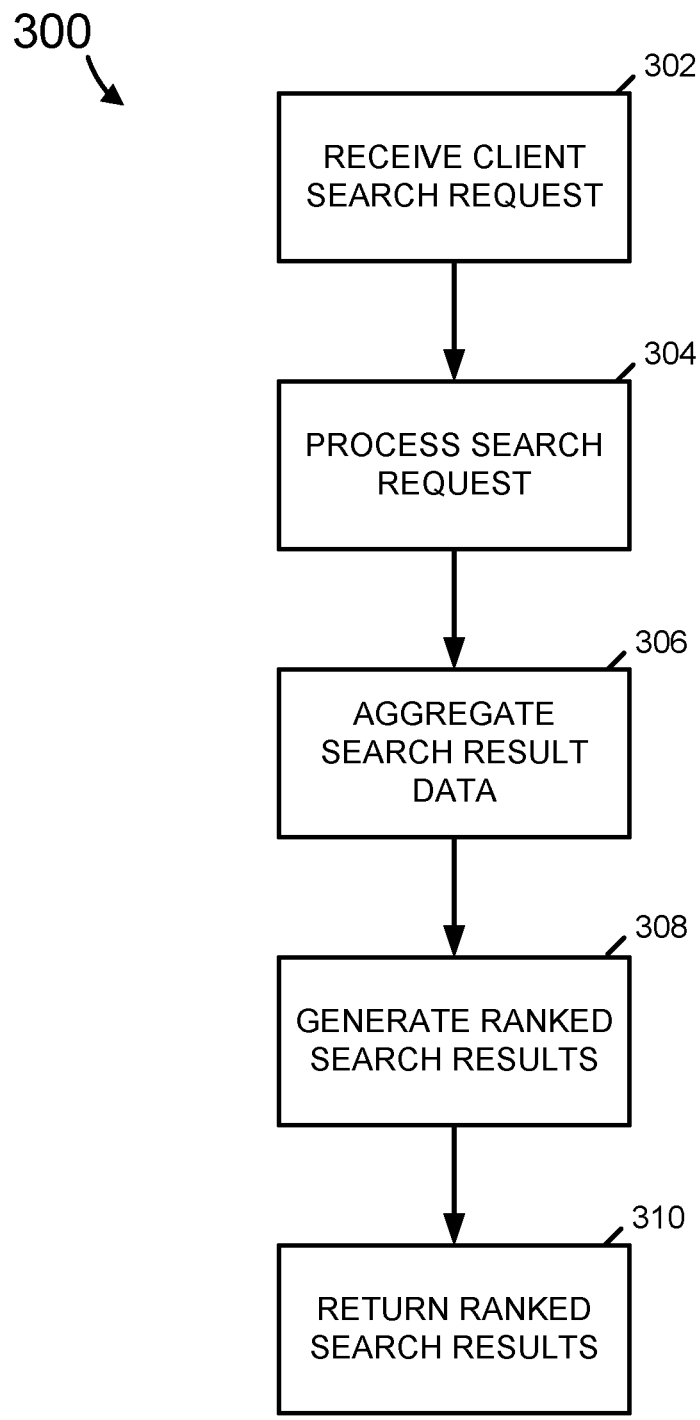
FIG. 3A is a flow diagram illustrating an overview of a process for providing ranked search results in response to a help request, in accordance with at least one example of the present disclosure.
Figure 3B:
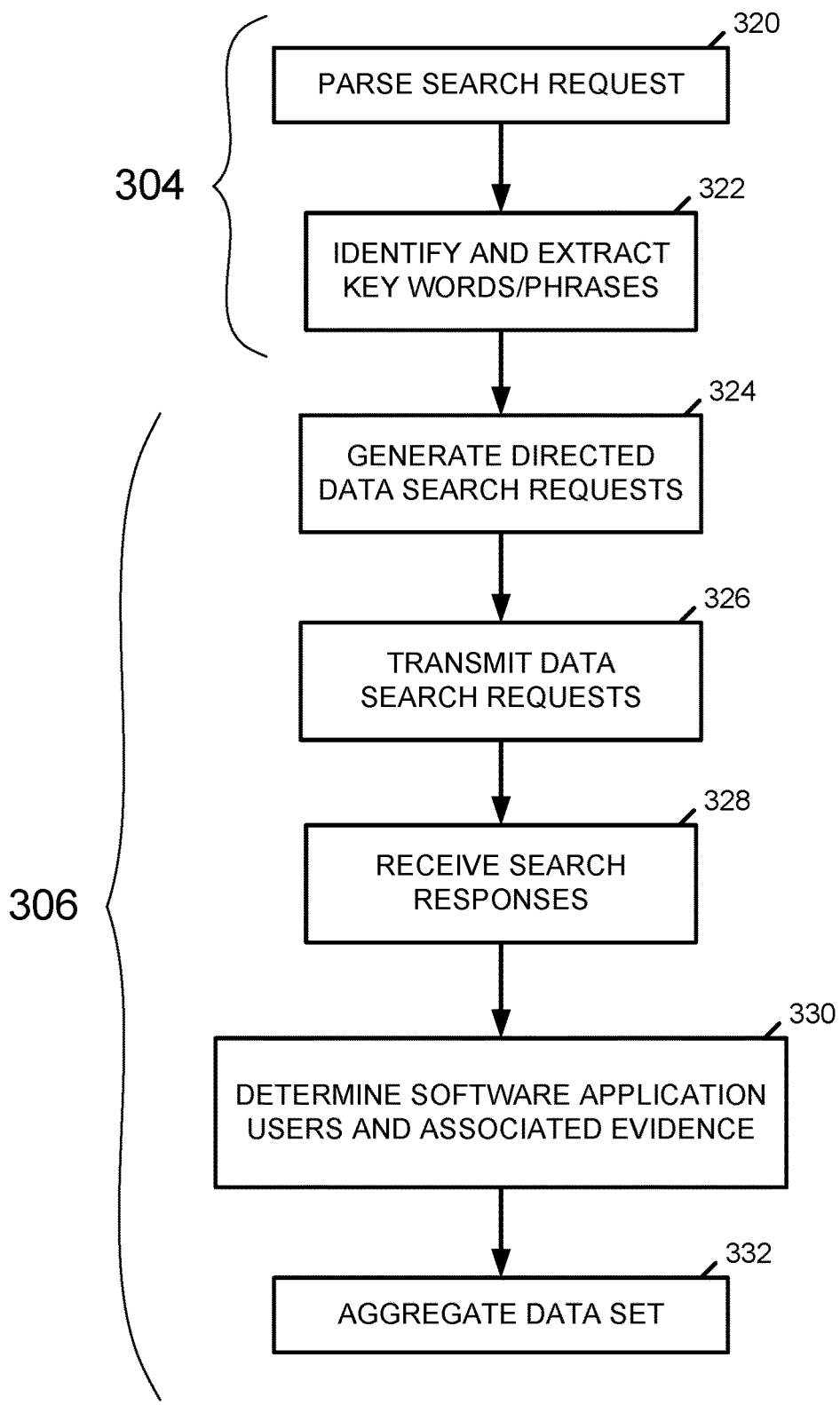
FIGS. 3B and 3C are flow diagrams that correspond at least in part to a portion of the flow diagram of FIG. 3A.
Figure 3C:
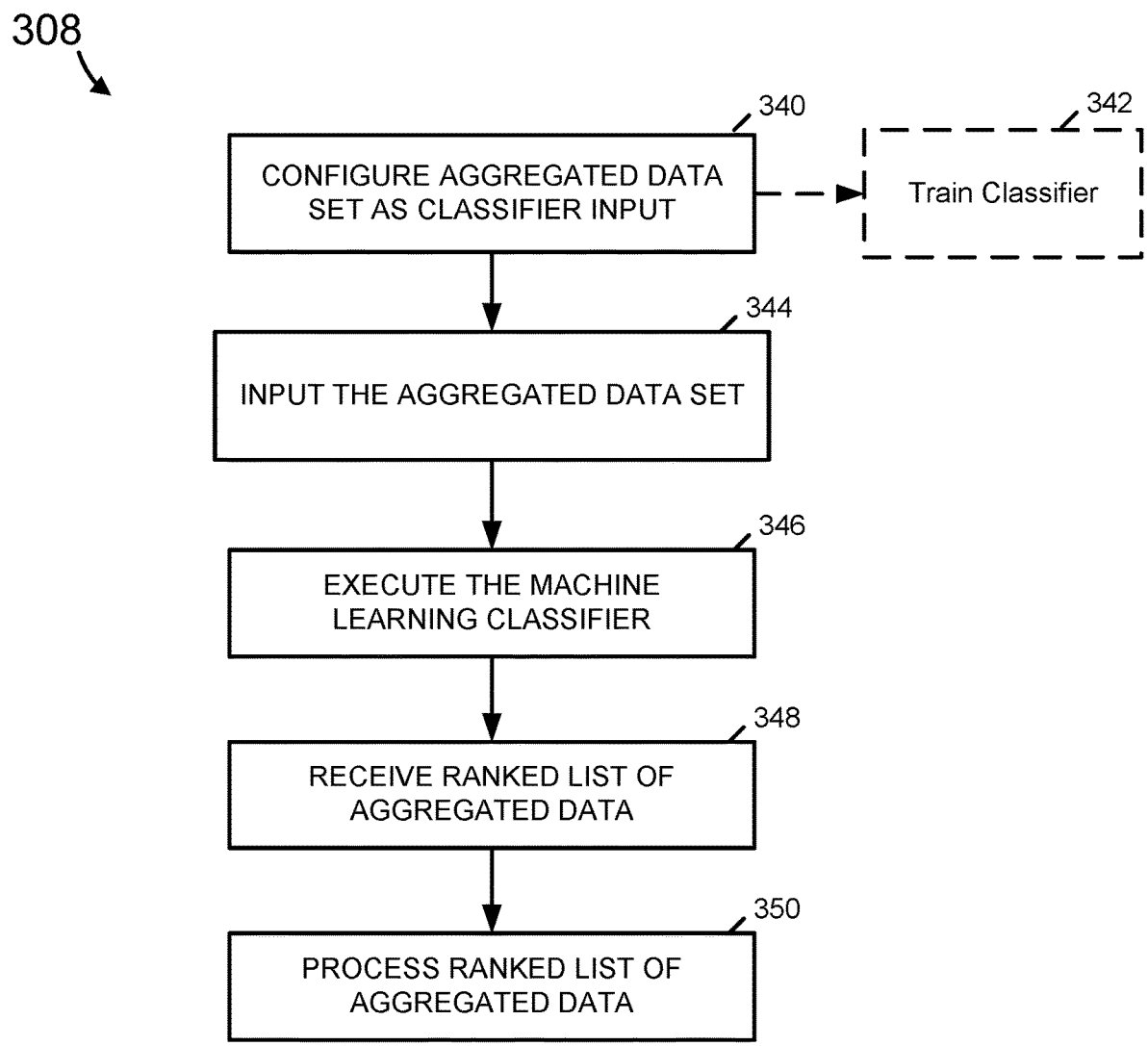

FIG. 3A illustrates a sample process 300 for receiving and processing a search request for assistance from a user of, for example, a distributed work environment as described herein. The process 300 can be implemented, for example, by a processor (e.g., processor 1002 as discussed below in reference to FIG. 10) of a remote computing device (e.g., remote computing device 104). FIGS. 3B and 3C provide additional detail of individual process steps as included in process 300 as shown in FIG. 3A and will be discussed in concert with FIG. 3A as appropriate.

Referring to FIG. 3A, a processor can receive 302 a client search request for assistance and/or identification of one or individual that can provide assistance as described herein. For example, the client search request can include a text string entered by a requesting user into a user interface control such as control 210 as shown in FIG. 2 and described above. The processor can process 304 the search request and aggregate 306 the search result data. FIG. 3B illustrates a more detailed sample implementation of processing 304 the search request and aggregating 306 the search result data.

As shown in FIG. 3B, processing 304 the search request can include the processor accessing a software program or set of specific instructions for processing the search request. For example, the processor can access a natural language processor such as language processor 108 as described above to process the search request. This natural language processor can use a set of instructions to analyze text strings or other similar inputs using, for example, natural language understanding. In certain examples, a language processor can use a set of human-defined and/or machine learning based rules for processing and analyzing a text string. In some examples, a natural language processor can be trained or otherwise programmed to identify keywords and/or phrases related to a specific implementation. For example, as described herein, the language processor can be configured to identify keywords for searching across a set of enabled application integrations (e.g., a set of applications accessible to users of a distributed workspace as described herein) and related personnel. In certain implementations, a commercially available language processor such as the Azure Natural Language Processing toolkit (developed by Microsoft of Redmond, Wash.) can be used.

As shown in FIG. 3B, the processor can parse 320 the search request. For example, parsing 320 the search request can include using a set of initial rules to remove or otherwise ignore certain words in the search request from further analysis. In certain implementations, parsing 320 the search request can include deleting various categories of words such as pronouns, linking verbs, prepositions, articles, and other similar words that are unlikely to be identified as keywords or words that provide central meaning or context to the search request. The processor can then identify 322 and extract any keywords and phrases from the parsed search request. Identified keywords can include and keywords that are associated with the enabled software application integrations as described herein. Additionally, in certain implementations, the identified keywords can include any location names such as cities, countries, office names, and other similar locational terms. In some examples, location information can be obtained or derived from additional sources such as a user's active directory location, a user's Internet protocol address, a user's home office information, and other similar sources.

Once a set of keywords and phrases are identified, the processor can aggregate 306 the search result data. As further shown in FIG. 3B, the processor can generate 324 one or more directed data search requests. For example, the processor can access one or more representational state transfer (REST) or RESTful APIs to process an individual search request and search for information amongst one or applications included in the enabled application integrations. For example, each integrated application can include its own associated data service configured to record statistics and other information about each application user. For example, if the application is a source code repository, an associated data service can record the number of times a user has accessed the repository, the number of times the user has revised a piece of code, the number of times a user has reviewed code, keywords associated with individual code projects, amount of time a user has used the repository, and other similar information. If the application is an email client, the associated data service can record a user's current level of activity, a repository of messages authored by a user, a repository of messages received by the user, and other similar information. Data services can also be configured to record information for other applications such as spreadsheet applications, presentation applications, billing applications, chat applications, word processing applications, project management applications, and other similar applications that could be used in a distributed workspace as described herein. In each of these examples, a data service associated with an application exposes an API that enables other processes to access information about users of the application that is recorded within the context of a domain ontology established by the application. As exemplified above, this information is application-specific and, therefore, the syntax and semantics of each API are as well.

Referring again to FIG. 3B, the processor can generate 324 the search requests to query one or more data services using, for example, a RESTful API request and transmit the request to one or more data services. The data services can process the request for their associated application and return a set of search response data.

As further shown in FIG. 3B, the processor can receive 328 the search responses and process the responses accordingly. In certain implementations, the processor can determine 330 one or more software application users and a set of evidence for each of the software application users from the search results. For example, the processor can identify user John Doe in the search results. The results can further include a set of evidence for the user John Doe. For example, the evidence can include information related to various interactions John Doe has had with one or more applications. The processor can generate a data structure to house the data from the search responses for each of the identified software application users and associated evidence. The processor can then aggregate 332 each of the data structures into an aggregated data set such as, for example, one or more relational database tables or other similarly organize data structure where a specific field or set of fields can be updated to include information contained in each of the software applications users in a single, aggregated data set.

For example, FIG. 4 illustrates a sample aggregated data set 400 organized as, for example, a relational database table that includes a set of search responses as described herein. As shown in FIG. 4, the data set 400 can include a set of data received as a results of querying, for example, data services such as data services 112 as described above. The results can be aggregated by a data aggregator such as data aggregator 110 into an aggregated data set such as data set 400. The data set 400 can include, for example, a number of data fields. In this example, the data fields include user identification (ID) fields 402 and evidence fields 404. As shown in FIG. 4, each user ID field 402 has an associated evidence field 404. However, it should be noted that such a relationship is shown by way of example only. In certain implementations, the data set 400 can include multiple evidence fields 404 associated with a single user ID field 402. In another example, each of the user ID field 402 and the evidence field 404 can be combined into a single data field representing a piece of data in the search results as described herein.

As further shown in FIG. 4, the column of user ID fields 402 can include individual fields 402a, 402b, 402c, and 402d. As shown in FIG. 4, the data set 400 can be arranged by alphabetical order of a user's last name as listed in the user ID field 402. Additionally, as shown in FIG. 4, the column of evidence fields 404 can include fields 404a, 404b, 404c, and 404d. In this example, the data listed in evidence field 404a corresponds to the user identified in user ID field 402a, the data listed in evidence field 404b corresponds to the user identified in user ID field 402b, the data listed in evidence field 404c corresponds to the user identified in user ID field 402c, and the data listed in evidence field 404d corresponds to the user identified in user ID field 402d.

Referring back to FIG. 3A, as noted above, the processor can aggregate 306 the search results data and generate 308 a set of ranked search results from the aggregated search data. As described above, the aggregated search data includes identification of one or more software application users and associated evidence received from queried data services associated with one or more applications. However, the aggregated search results may be unsorted or sorted in an unrelated manner to the original client search request such as alphabetical order by last name. To better order the aggregated search data, the processor can generate 308 a set of ranked search results using, for example, a process such as that shown in FIG. 3C.

FIG. 3C illustrates a more detailed sample process for generating 308 a set of ranked search results. The processor can configure 340 the aggregated data set as an input for a machine learning classifier. For example, the processor can properly format the aggregated data set as a set of input variables for a specifically trained classifier as described herein. Additionally, in some examples, the processor can train 342 the machine learning classifier using the initial evidence weightings as described herein. In certain implementations, the evidence weightings can provide the machine learning classifier a set of rules or instructions for weighting individual pieces of data contained in the aggregated data set when ranking the results. For example, if a software application user's interaction with a coding application is more likely to be important than the software application user's interaction with an email application, results associated with the coding application can be more heavily weighted. Similarly, location information can be more heavily weighted such that a software application user that is in the same location as the requesting user is ranked higher in the list. In some examples, the evidence weightings can be selected based one or more keywords in the query. For example, if the query includes information that is likely to result in an engineering software application user being more highly ranked than a sales software application user, the evidence associated with interactions with coding applications and other similar engineering-specific applications can be more highly weighted than evidence associated with billing software and other similar sales-specific applications. Specific examples of machine learning classifiers are described below in reference to FIGS. 6A and 6B.

As further shown in FIG. 3C, the processor can input 344 the aggregated data set into the machine learning classifier. The processor can execute or apply 346 the machine learning classifier to analyze and process the aggregated data set based upon the input evidence weightings. For example, the classifier can be configured to sort the aggregated data set into a ranked list of aggregated software application users. The processor can receive 348 the ranked list of software application users as an output of the machine learning classifier and, in some examples, perform post-processing 350 on the ranked list.

Referring again to FIG. 3A, once the processor has generated 308 the ranked list of search results, the processor can transmit 310 the ranked list of search results to the requesting user's client device.

It should be noted that the sample processes as shown in FIGS. 3A-3C are provided by way of example only. Depending upon the design and implementation of the help and assistance request techniques as described herein, one or more processes or process steps as shown in FIGS. 3A-3C can be altered accordingly.

In certain implementations, the help and assistance request systems, processes, and techniques as described herein can use both open-loop and closed-loop feedback systems to improve results based upon user feedback. For example, the requesting user can be queried for feedback on the search results which can be used in a closed-loop feedback system for improving the overall functionality and accuracy of the machine learning classifier as described below in reference to FIGS. 6A and 6B. For example, the requesting user can provide a score or other similar rating of the search results. In certain implementations, the user interface can include a feedback control configured to prompt the requesting user to provide feedback. The user can be asked to rate the search results on a scale of one to ten or to provide a yes/no answer to a question such as "were the search results helpful?" Based upon the requesting user's feedback, a score can be assigned to the search results. For example, if the requesting user provides a score on a scale of one to ten, the number provided can be considered the feedback score. In another example, If the requesting user is given a yes/no query, a "yes" answer can be assigned a score of one and a "no" answer can be assigned a score of zero.

Similarly, additional feedback such as user click telemetry can be monitored and used in an open-loop feedback system to update, for example, an unsupervised ranking process that is user specific and based upon user-specific feedback. For example, the user click telemetry can provide an indication that a user generally selects the same software application user in a list, regularly selects a lower-ranked software application user in the list, repeats a search in a short period of time or after selecting a number of software application users in the list, and other similar click telemetry data. Based upon the user-specific feedback, the processor as described above can generate personalized search results for an individual user during, for example, post classifier processing 350 of the search results.

Figure 5:
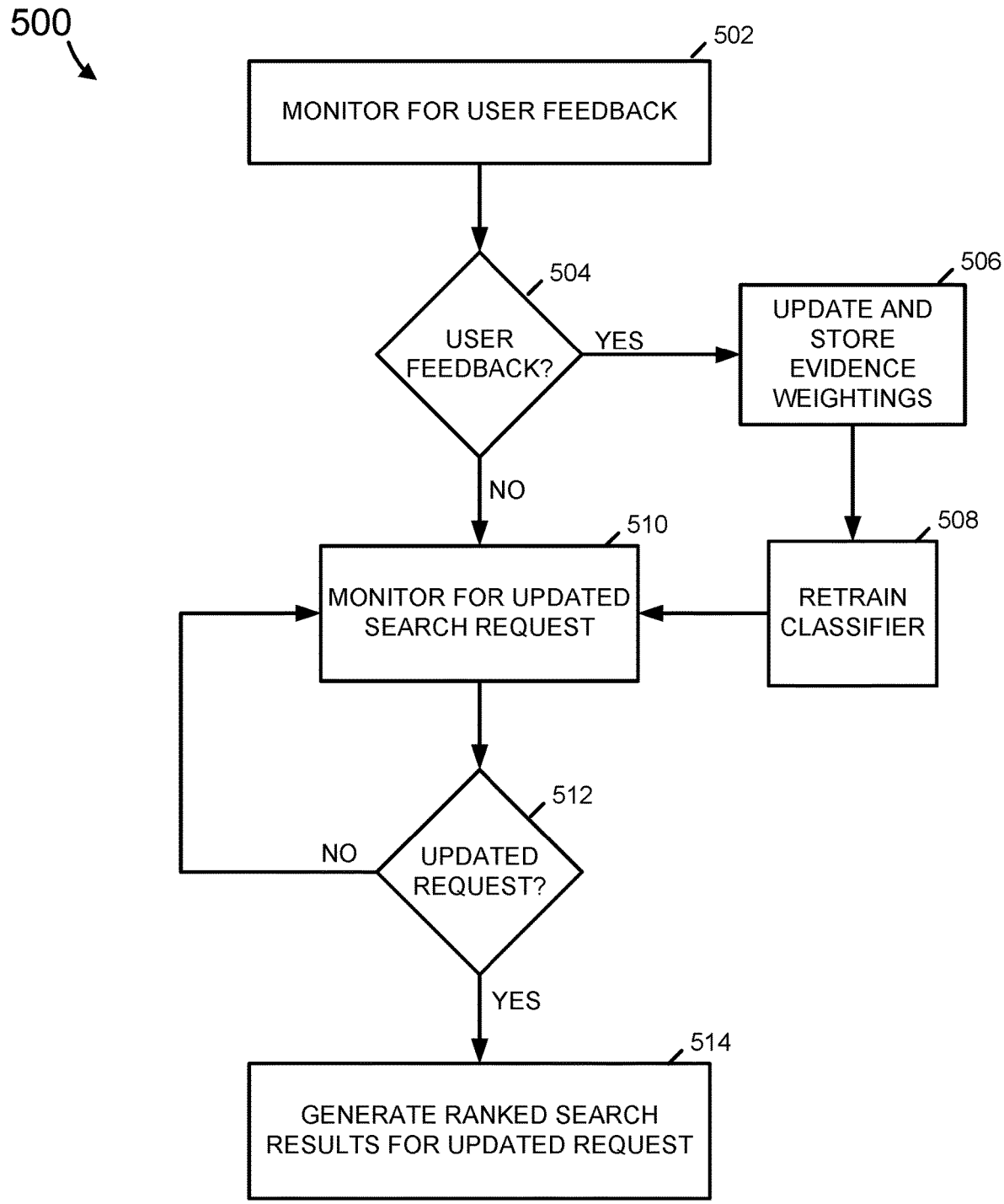
FIG. 5 is a flow diagram illustrating a process overview of responding to user feedback and additional help requests, in accordance with at least one example of the present disclosure.

FIG. 5 illustrates a sample process 500 for receiving user feedback and updating the search process as described above in, for example, the discussion of FIG. 3A. For example, as shown in FIG. 5, the processor can monitor 502 for user feedback. As noted above, the user feedback can include a user response to a direct query (e.g., "Were these results useful?") as well as click telemetry. If processor determines 504 that the user has provided feedback, the processor can update 506 a set of updated evidence weightings for use with the machine learning classifier as described herein. For example, the processor can be configured to retrain 508 the machine learning classifier using the updated evidence weightings to improve the overall performance of the machine learning classifier. The processor can also update user-specific information that can be used to adjust or otherwise customize a set of ranked search results for an individual requesting user during, for example, post classifier processing as described above (e.g., post processing 350 as shown in FIG. 3C).

As further shown in FIG. 5, the processor can continue to monitor 510 for an updated search request. In certain implementations, the updated search request can be submitted by any user of the system, not necessarily the original requesting user. If the processor does not determine 512 that an updated request has been received, the processor can continue to monitor 510 for an updated search request. However, if the processor does determine 512 that an updated search request has been received, the processor can generate 514 a set of ranked search results for the updated search using, for example, the machine learning classifier as retrained with the updated set of evidence weightings as described herein.

It should be noted that the sample processes as shown in FIG. 5 is provided by way of example only. Depending upon the design and implementation of the help and assistance request techniques as described herein, one or more processes or process steps as shown in FIG. 6 can be altered accordingly.

One technique for ranking the aggregated user data as discussed in regard to FIGS. 3A-3C and FIG. 5 as described above, is using supervised machine learning. As described herein, supervised machine learning techniques are used to derive classifiers that can be used to correctly, or highly accurately, to rank the aggregated user data and associated evidence as described herein. Supervised machine learning relies on the idea that a high percentage of the data to be classified are assigned the correct labels during the learning process. For example, depending upon the type of machine learning technique used, a training set can include 95% of the data having the correct label during the learning process. In other examples, the training set can include 90%-100% of the data having the correct label. Thus, as described herein, in order to accurately train a ranking classifier as described herein, a high percentage of the training data (e.g., the aggregated user data and associated evidence) should be accurately labeled with the corresponding evidence weightings.

Figure 6A:
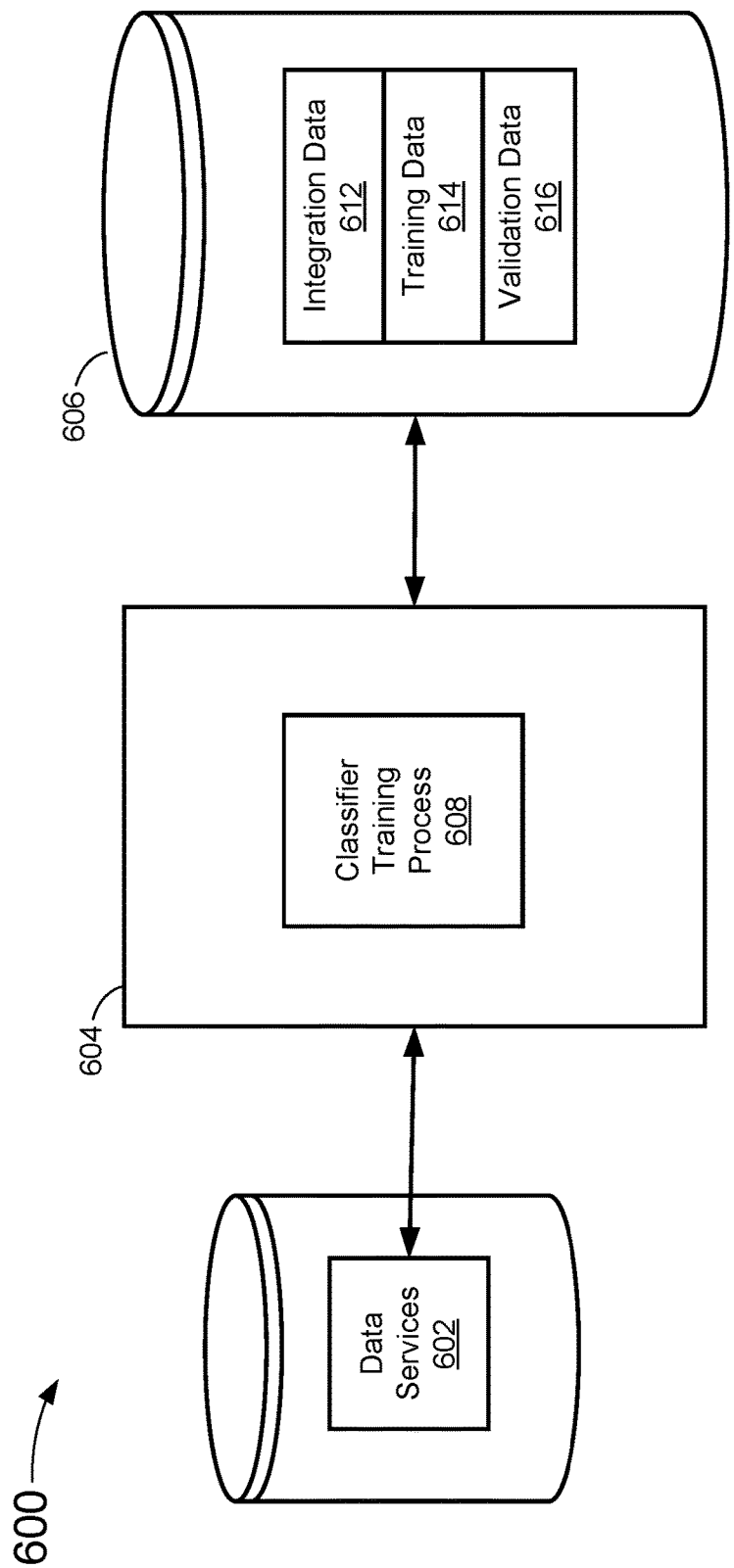
FIGS. 6A and 6B illustrate schematic views of a system for training a machine learning classifier, in accordance with at least one example of the present disclosure.

FIG. 6A illustrates a sample overview of a distributed system 600 for training a search result ranking classifier as described herein. As shown in FIG. 6A, a set of data services associated with one or more applications and accessible via one or more API as described herein can be operably coupled to a remote computing device 604. The remote computing device 604 can be operably connected to a data repository 606 that is configured to store various information. As further shown in FIG. 6A, the remote computing device can include a classifier training process 608. As described herein, the classifier training process 608 can be configured to generate a search results ranking classifier based upon a set of training data and any rules for the classifier. For example, to generate the training data, the data repository 606 can include a set of user integration data 612 include that includes application-specific historical data for a population of application users as well as one or more sets of optimal application user rankings generated based upon the historical data. For example, the user integration data 612 can include historical information for each application user organized based upon keywords or other similar identifiers and associated ranked search result sets that have been generated based upon keyword-based searches of the historical information. In certain implementations, the user integration data 612 can also include expertise ratings for individual users selected based upon, for example, a user's historical experience with a particular application. The data repository can also include a set of training data 614 generated from the user integration data 612 and a set of validation data also generated from the user integration data. The training data 614 can be used by the remote computing device 604 to train the classifier using the classifier training process 608. After training, the remote computer 604 can use the validation data 616 to gauge the sensitivity and specificity of the generated classifier. The classifier can then be used, for example, as the data ranking process as described above for use in classifying and ranking search results to user requests for assistance as described herein in, for example, the discussions of FIGS. 3A-3C and FIG. 5 above.

Figure 6B:
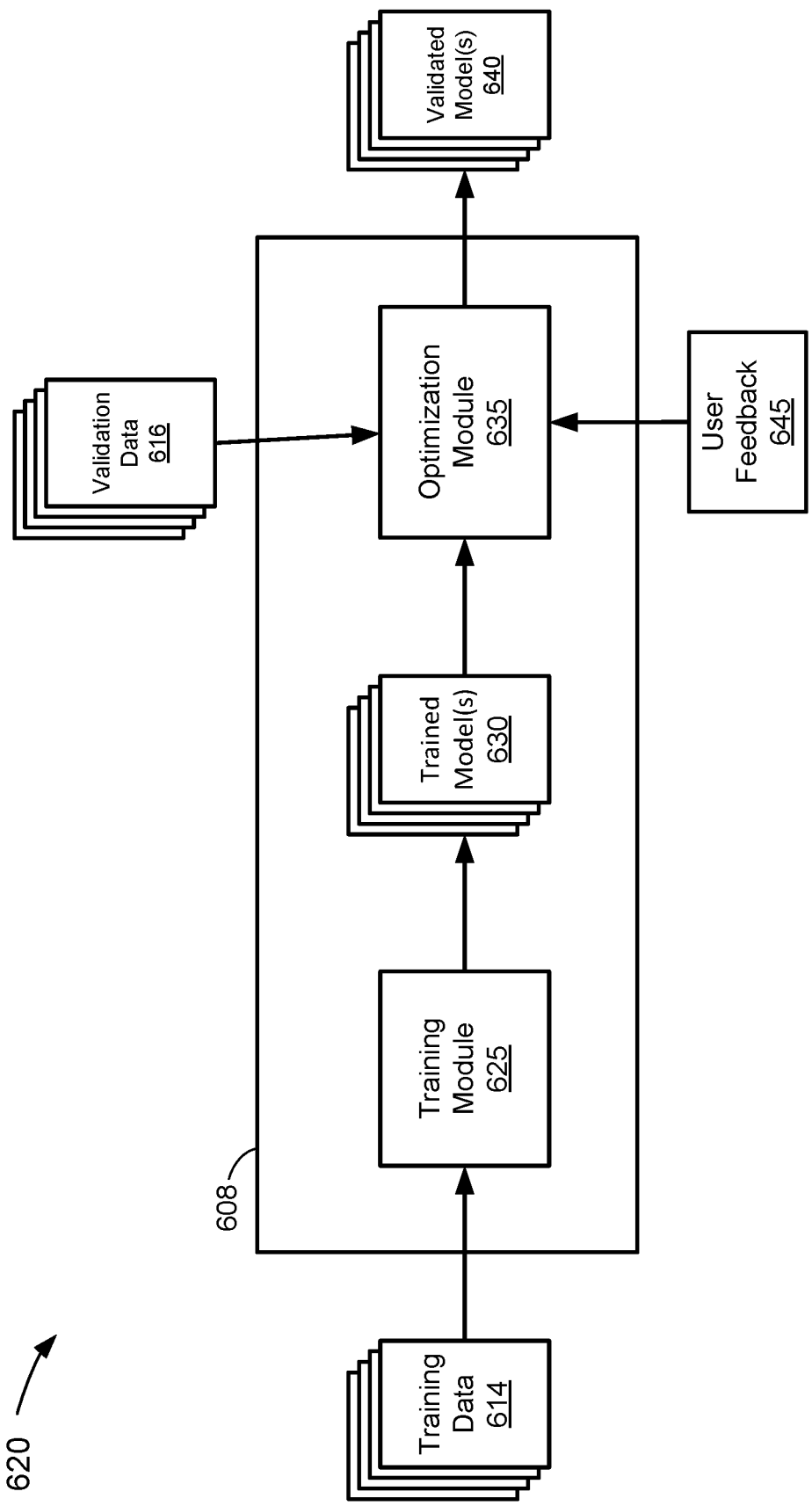

FIG. 6B illustrates a sample process 620 for training and validating one or more ranked search results classification models for a supervised machine learning process using the classifier training process 608 as described above. A set or population of known records (e.g., integration data 612) can be provided as the data set used to train (e.g., via training data set 614) and validate (e.g., via the validation data 616) the classification models.

The training data set 614 can be fed into a training module 625. The training module 625 can include one or more untrained data structures such as a series of data trees (e.g., organized using a random forest tool). Using the known input variables and known outcomes from the training data set 614, the training module 625 can iteratively process each data point in the training set, thereby training the data structures to more accurately produce the expected (and known) outcomes and output one or more trained classifier models 630. The one or more trained classifier models 630 can represent a set of models that provide the most accurate classification and generation of an outcome for a known set of input variables that could be generated from the training data set 614. An optimization module 635 can be configured to further refine the trained classifier models 630 using additional known records. For example, the validation data set 616 can be input into the optimization module 635 for further optimization of the one or more trained classifier or regression models 630.

In certain implementations, the optimization module 635 can process the validation data set 716 to optimize the trained classifier models 630 by, for example, refining thresholds, tuning learning parameters (e.g., learning rate and regularization constant information), and other similar optimization processes. The optimization module 635 can produce one or more validated classifier models 640. Depending upon the intended purpose of the validated classifier models 640, the models can have certain classifier parameters (e.g., a certain specificity and/or sensitivity).

As the validated classifier models 640 are used to classify or provide output values for user search requests (e.g., to produce new outputs for a set of identified search request keywords as described herein), the produced outcomes can be used to better validate the process using a closed loop feedback system. For example, as a set of search results is ranked, the ranked set of search results can be interacted with and validated by the requesting user. The requesting user's interaction can then be provided as feedback 645 to the optimization module 635. The optimization module 635 can further refine the validated classifier models 640, thereby providing a closed loop system where the models are updated and upgraded regularly.

In a specific example, a process such as the search ranking classifier model as described herein can be implemented as a network of nodes interconnected to form an artificial neural network. For example, an artificial neural network can include, for example, one or more nodes organized into an input layer, a series of hidden layers, and one or more nodes organized into an output layer.

In an artificial neural network, the nodes include a plurality of artificial neurons, each artificial neuron having at least one input with an associated weight. The artificial neural network parameters (e.g., weights) can be trained by the inputting of different sets of aggregated software user data from the training data and comparing the network output with a ground truth output from the training data. The training process can modify the network parameters to minimize the difference between the network output and the ground truth output. This results in the artificial neural network being trained to produce a targeted classification, e.g., a ranked set of users as described herein.

In certain implementations, the artificial neural network can be an adaptive system, where it changes based on external or internal information that flows through the artificial neural network during the training or learning phase. Specifically, the weight (or strength) of the connections (such as between adjacent artificial neurons, or between an input and an artificial neuron) within the artificial neural network can be adapted to change to match the known outputs. For example, as described above, the user feedback to the ranked listing of users can be used to generate an updated set of evidence weightings that can be used to adapt the artificial neural network.

Figure 7:
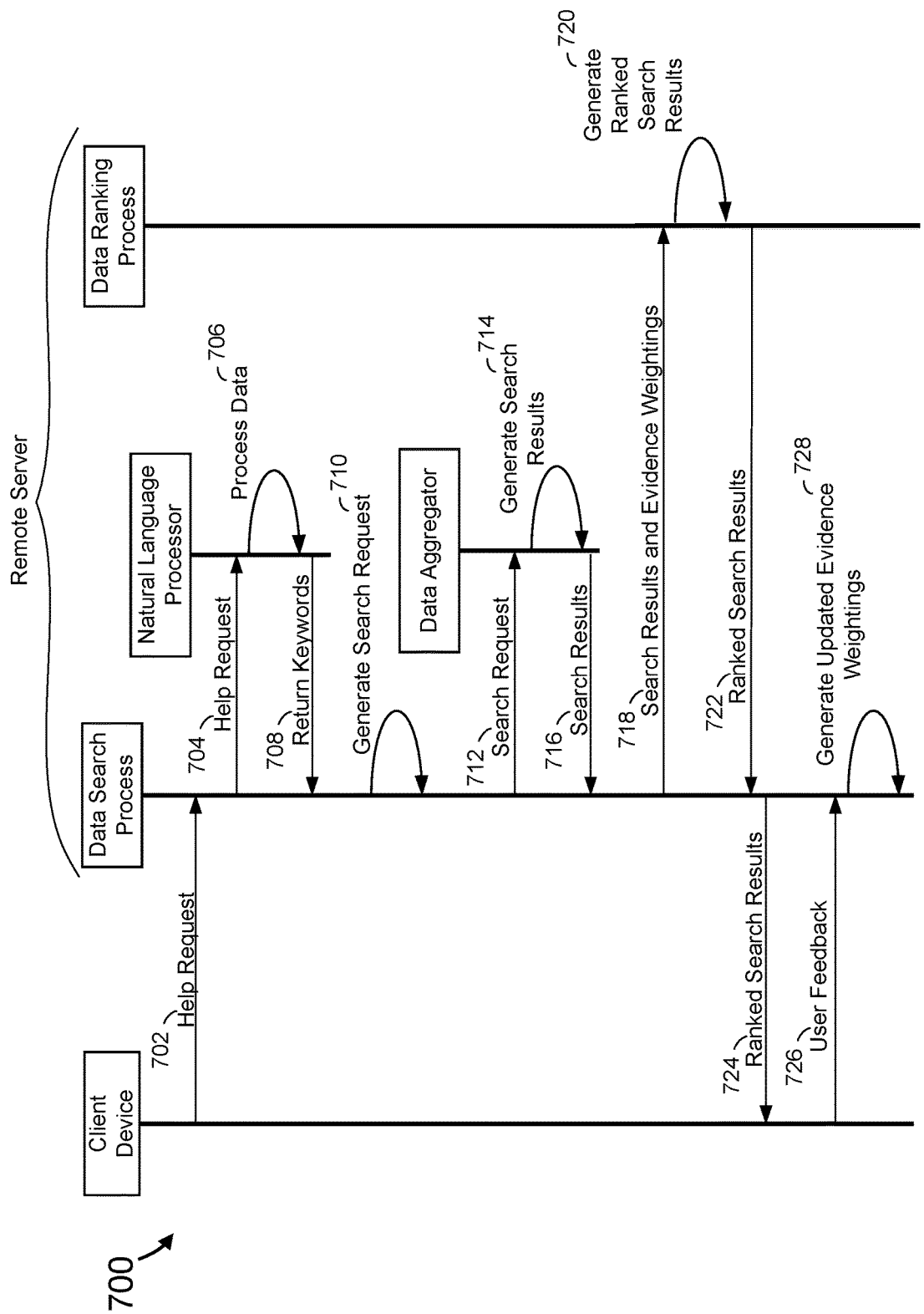
FIG. 7 is a sample sequence diagram for fulfilling a help request, in accordance with at least one example of the present disclosure.

FIG. 7 illustrates a sample sequence diagram 700 of a process for responding to a user request from a client device for assistance. As shown in the diagram 700, a client device such as client device 102 as described above in regard to FIG. 1 can transmit 702 a help request to a data search process implemented on, for example, a remote computing device such remote computing device 104 as described above in regard to FIG. 1. The remote computing device can receive the help request and transmit 704 the help request to a natural language processor. The natural language processor can process 706 the received data and extract one or more keywords from the help request. The natural language processor can return 708 the keywords to the data search process. Based upon the returned keywords, the data search process can generate 710 a search request.

As further shown in FIG. 7, the data search process can transmit 712 the search request to the data aggregator. Using the received search request, the data aggregator can generate 714 a set of search results by, for example, accessing one or more data services as described herein. The data aggregator can return 716 the search results to the data search process. In certain implementations, the data search process can analyze and process the search results and transmit 720 the search results to the data ranking process. In some examples, the data search process can also transmit a set of initial evidence weightings to be used for training the machine learning classifier as described herein. Using the trained machine learning classifier, the data search process can generate 720 a set of ranked search results. In certain implementations, the data search process can filter, format, or otherwise process the search results and transmit 722 the ranked search results to the data search process. The data search process can transmit 724 the ranked search results to the client device.

In certain implementations, the client device can transmit 726 user feedback to the data search process indicating whether the ranked search results were useful as well as feedback information on how the user interacted with the ranked search results. Based upon this feedback, the data search process can generate 728 updated evidence weightings. In certain implementations, the updated evidence weightings can be used to retrain the machine learning classifier for improved future performance.

It should be noted that the sequence as shown in diagram 700 is provided by way of example only. In some examples, the order of individual sequence steps can be altered and the device or process implementing an individual sequence step can be altered based upon the design and implementation of the help request techniques and system as described herein.

Figure 8A:
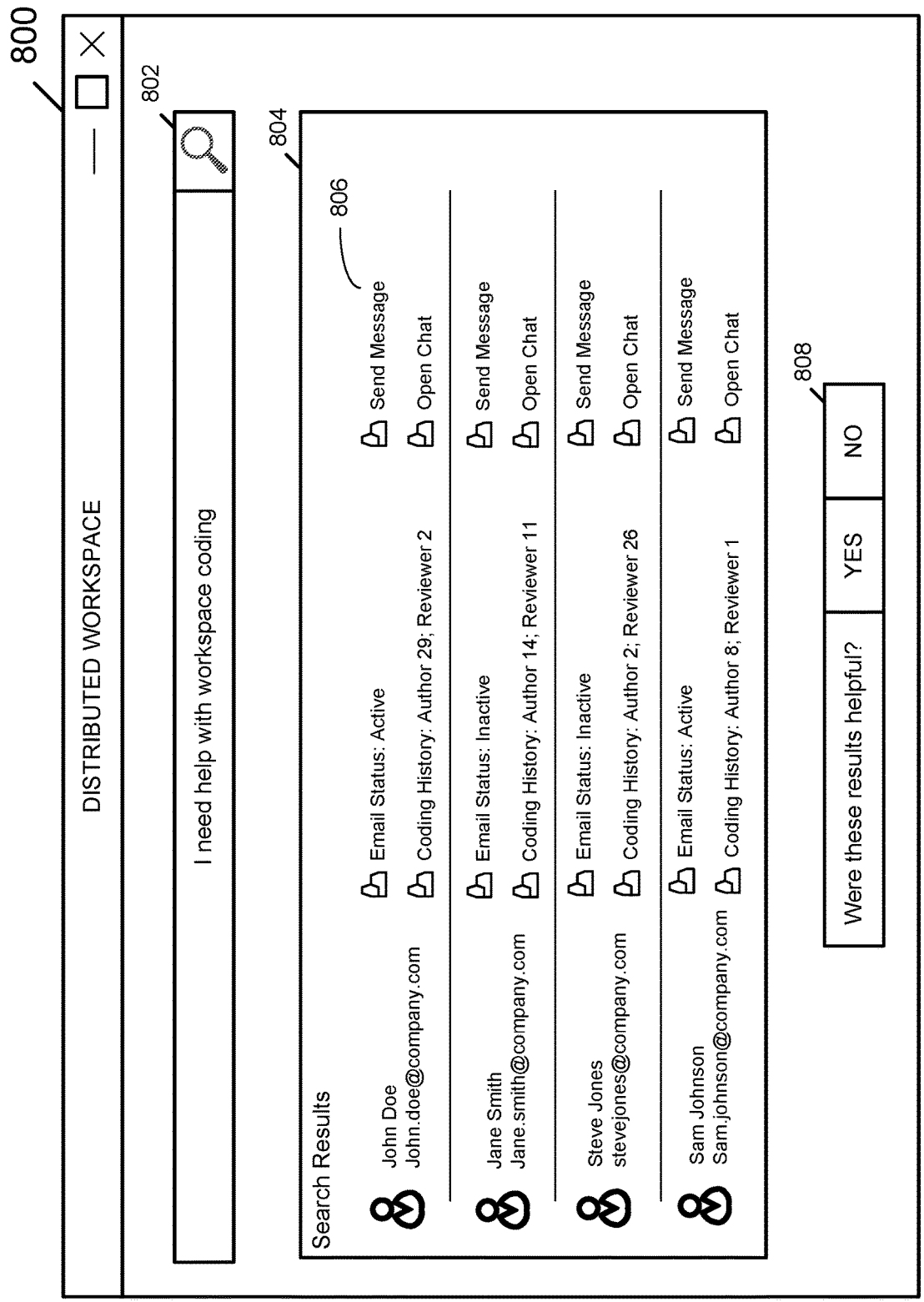
FIGS. 8A and 8B are sample user interface screens showing ranked search results provided in response to a help request, in accordance with at least one example of the present disclosure.
Figure 8B:
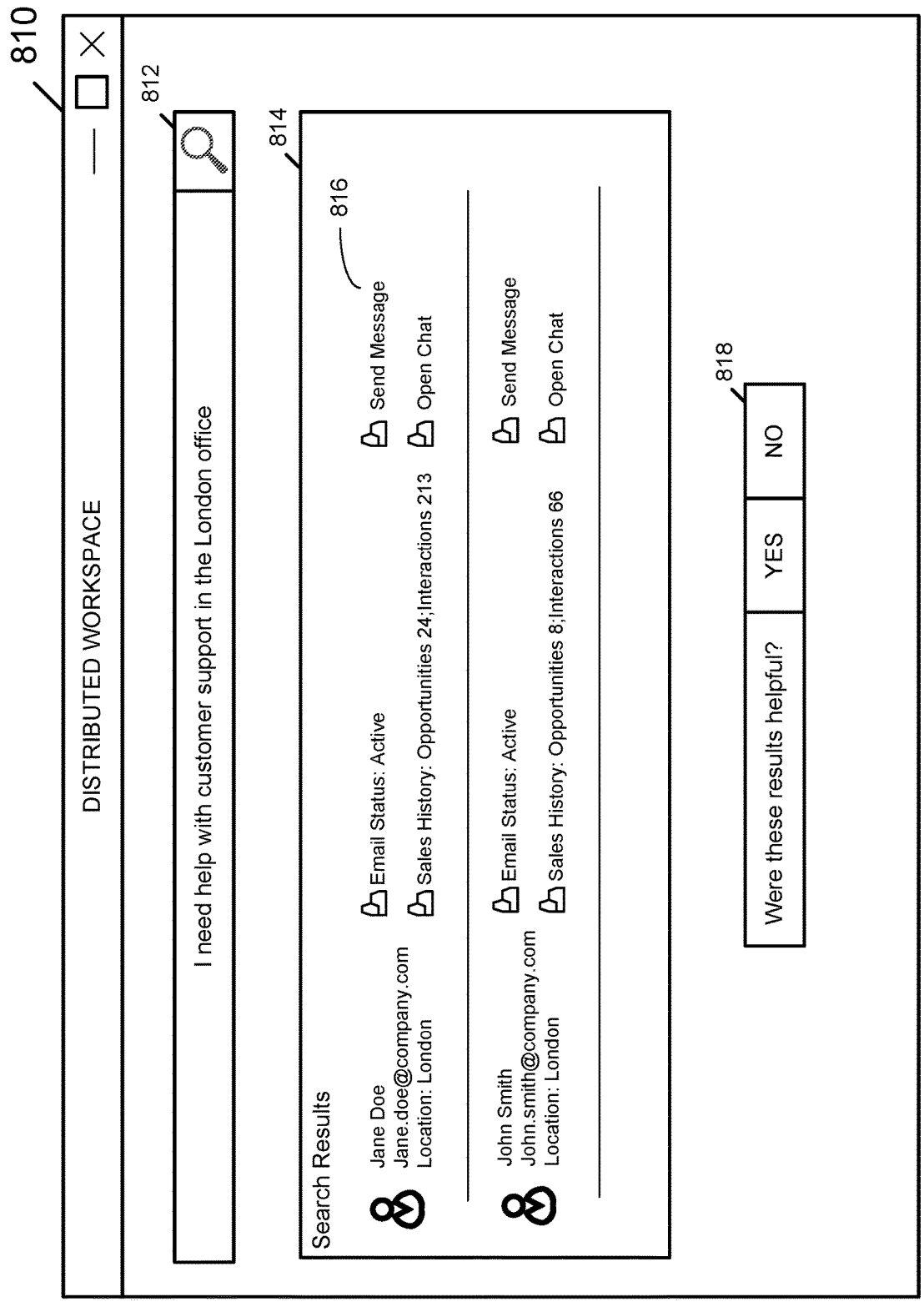

FIGS. 8A and 8B illustrate sample views of a user interface screens 800 and 810 that are displayed on a client such as, for example, the client device 102 as described above and managed by a client agent configured to manage access to remote resources hosted by, for example, remote computing device 104 as described above. As specifically shown in FIGS. 8A and 8B, screens 800 and 810 illustrate a distributed workspace that include a set of ranked search results to a particular user query for assistance. The screens 800 and 810 can provide an interaction interface for the user to review and access the ranked search results, as well as provide feedback on the ranked search results as described herein.

As illustrated in FIG. 8A, the screen 800 includes user interface controls 802, 804, 806, and 808. In certain implementations, control 802 can be configured to provide a text entry box for receiving a query or help request from a user as described herein. For example, the user can access control 802 to enter a specific help request for a specific topic such as shown in FIG. 8A such as "I need help with workspace coding." In such an example, the query includes a specific business area to direct the search for assistance (e.g., workspace engineering and/or coding). The control 804 can be a search results display window that is configured to present or otherwise display the ranked search results received in response to the user query as entered into control 802. For example, as shown in FIG. 8A, the ranked search results include four individuals that have been identified, ranked, and returned as the ranked search results using the techniques and processes as described herein. Additionally, as shown by way of example, control 804 includes the search results as included in aggregated data set 400 as shown in FIG. 4 that have been ranked using the techniques and processes as described herein.

As further shown in FIG. 8A, the control 804 can include one or more additional controls 806 that include an individual search result selected from the list of ranked search results. For example, control 806 includes specific information about the user listed in that entry of the search results. As shown in FIG. 8A, the control 806 can include information such as the user's name, contact information such as email address, and application specific information as collected by, for example, the data aggregator as described above. For example, the application specific information can include the user's current email status, an option to send the user a message or directly chat with the user, and one or more sets of evidence that are directly related to the requesting user's query. For example, as shown in FIG. 8A, the request included a request for help with workspace coding. The data search process as described herein can receive that request and search for users who have demonstrated experience with workspace coding. As shown in control 806, an individual search result can include coding-specific details for the user identified in the result such as how often the user in the search results has authored related code or how often the user in the search results has reviewed related code.

As further shown in FIG. 8A, control 808 can include an option for the requesting user to provide feedback by indicating, for example, whether the results were helpful or not. Additionally, the data request system can monitor the requesting user's interactions with the search results to determine individual tendencies. For example, the system can determine if the user is more likely to contact a user in the search results that is currently active on email or chat. In such an example, the data request system can update the requesting user's profile to more heavily weigh users in the search results that are currently active on email and/or chat than those that are inactive.

As illustrated in FIG. 8B, the screen 810 can include an alternate set of search results as those shown in FIG. 8A. The screen 810 includes user interface controls 812, 814, 816, and 818. In certain implementations, control 812 can be configured to provide a text entry box for receiving a query or help request from a user as described herein. For example, the user can access control 812 to enter a specific help request for a specific topic such as shown in FIG. 8B such as "I need help with customer support in the London office." In addition to a specific business area to direct the search for assistance (e.g., sales), the query includes a specific location (i.e., London). The control 814 can be a search results display window that is configured to present or otherwise display the ranked search results received in response to the user query as entered into control 812. For example, as shown in FIG. 8B, the ranked search results include four individuals that have been identified, ranked, and returned as the ranked search results using the techniques and processes as described herein.

As further shown in FIG. 8B, the control 814 can include one or more additional controls 816 that include an individual search result selected from the list of ranked search results. For example, control 816 includes specific information about the user listed in that entry of the search results. As shown in FIG. 8B, the control 816 can include information such as the user's name, contact information such as email address, and application specific information as collected by, for example, the data aggregator as described above. In addition, as the query in control 812 includes a specific location, the control 816 can include location information for each user listed in the search results. As further shown in control 816, the application specific information can include the user's current email status, an option to send the user a message or directly chat with the user, and one or more sets of evidence that are directly related to the requesting user's query. For example, as shown in FIG. 8B, the request included a request for help with customer support. The data search process as described herein can receive that request and search for users who have demonstrated experience with customer interaction and support. As shown in control 816, an individual search result can include sales history details for the user identified in the result such as how often the user in the search results has interacted directly with customers and how often the user in the search results has completed a sales opportunity.

As further shown in FIG. 8B, control 818 can include an option for the requesting user to provide feedback by indicating, for example, whether the results were helpful or not. Additionally, the data request system can monitor the requesting user's interactions with the search results to determine individual tendencies as described above.

Hardware Implementation Examples

Figure 9:
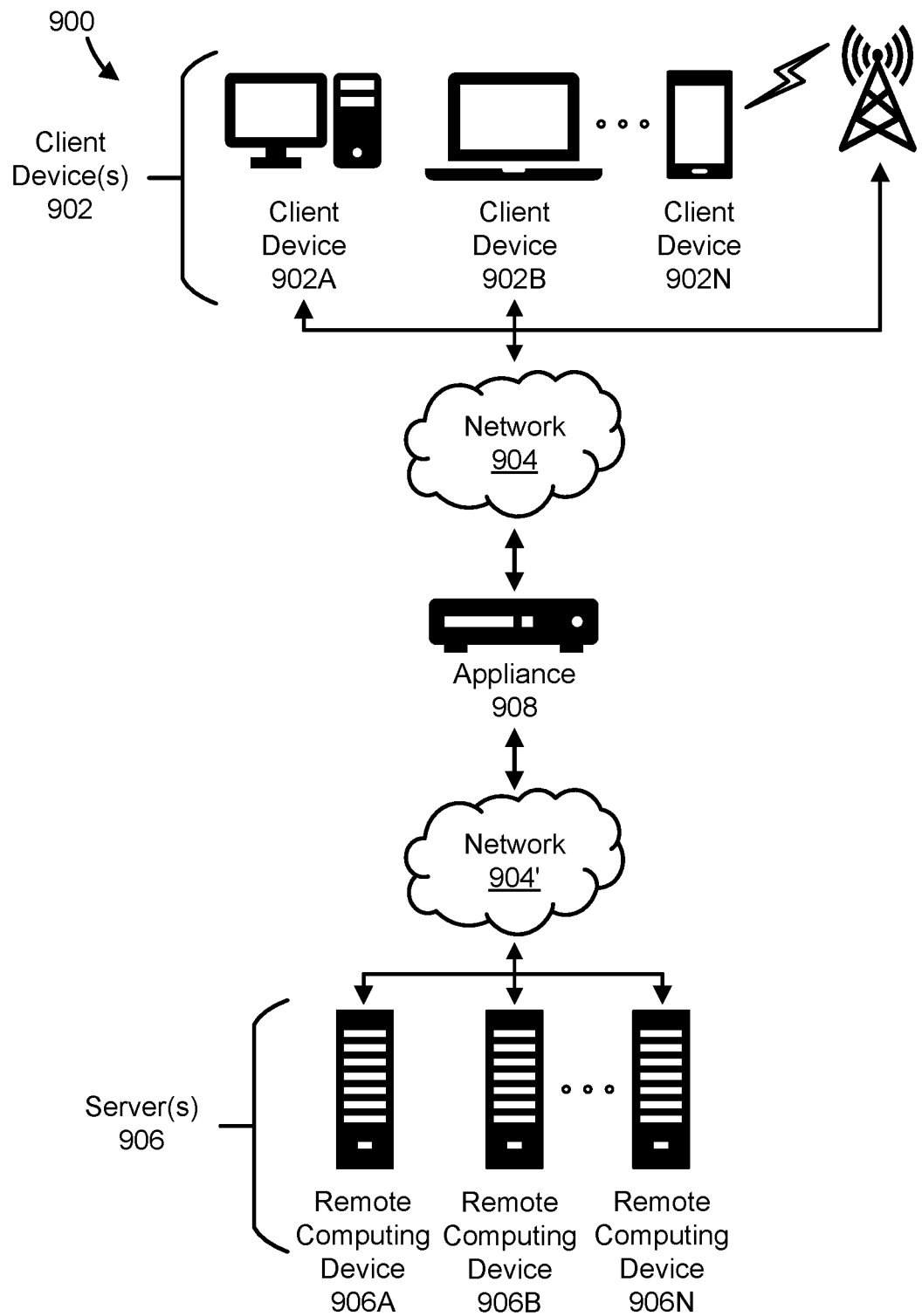
FIG. 9 is a block diagram of a network environment of computing devices in which various aspects of the present disclosure can be implemented.

FIG. 9 illustrates a non-limiting network environment 900, in which various aspects of the disclosure can be implemented, includes one or more client devices 902A-902N, one or more remote computing devices 906A-906N, one or more networks 904, 904', and one or more appliances 908 installed within the computing environment 900. The client devices 902A-902N communicate with the remote computing devices 906A-906N via the networks 904, 904'. The computing environment 900 can also be referred to as a distributed computer system.

In some examples, the client devices 902A-902N communicate with the remote computing devices 906A-106N via an intermediary appliance 908. The illustrated appliance 908 is positioned between the networks 904, 904' and may also be referred to as a network interface or gateway. In some examples, the appliance 908 can operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some examples, multiple appliances 908 can be used, and the appliance(s) 908 can be deployed as part of the network 904 and/or 904'.

The client devices 902A-902N may be generally referred to as client devices 102, local machines 902, clients 902, client nodes 902, client computers 902, computing devices 902, endpoints 902, or endpoint nodes 902. The remote computing devices 906A-906N may be generally referred to as servers 906 or a server farm 906. In some examples, a client device 902 can have the capacity to function as both a client node seeking access to resources provided by a server 906 and as a server 906 providing access to hosted resources for other client devices 902A-902N. The networks 904, 904' may be generally referred to as a network 904. The networks 904 can be configured in any combination of wired and wireless networks.

A server 906 can be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 906 can execute, operate, or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft Internet Protocol telephone; an application for streaming video and/or audio; an application for facilitating real-time-data communications; a HyperText Transfer Protocol client; a File Transfer Protocol client; an Oscar client; a Telnet client; or any other set of executable instructions.

In some examples, a server 906 can execute a remote presentation services program or other program that uses a thin client or a remote-display protocol to capture display output generated by an application executing on a server 906 and transmit the application display output to a client device 902.

In yet other examples, a server 906 can execute a virtual machine providing, to a user of a client device 902, access to a computing environment. The client device 902 can be a virtual machine. The virtual machine can be managed by, for example, a hypervisor, a virtual machine manager (VMM), or any other hardware virtualization technique within the server 906.

In some examples, the network 904 can be: a local area network (LAN); a metropolitan area network (MAN); a wide area network (WAN); a primary public network 904; and a primary private network 904. Additional examples can include a network 904 of mobile telephone networks that use various protocols to communicate among mobile devices. For short range communications within a wireless local-area network (WLAN), the protocols can include 802.11, Bluetooth, and Near Field Communication (NFC).

Figure 10:
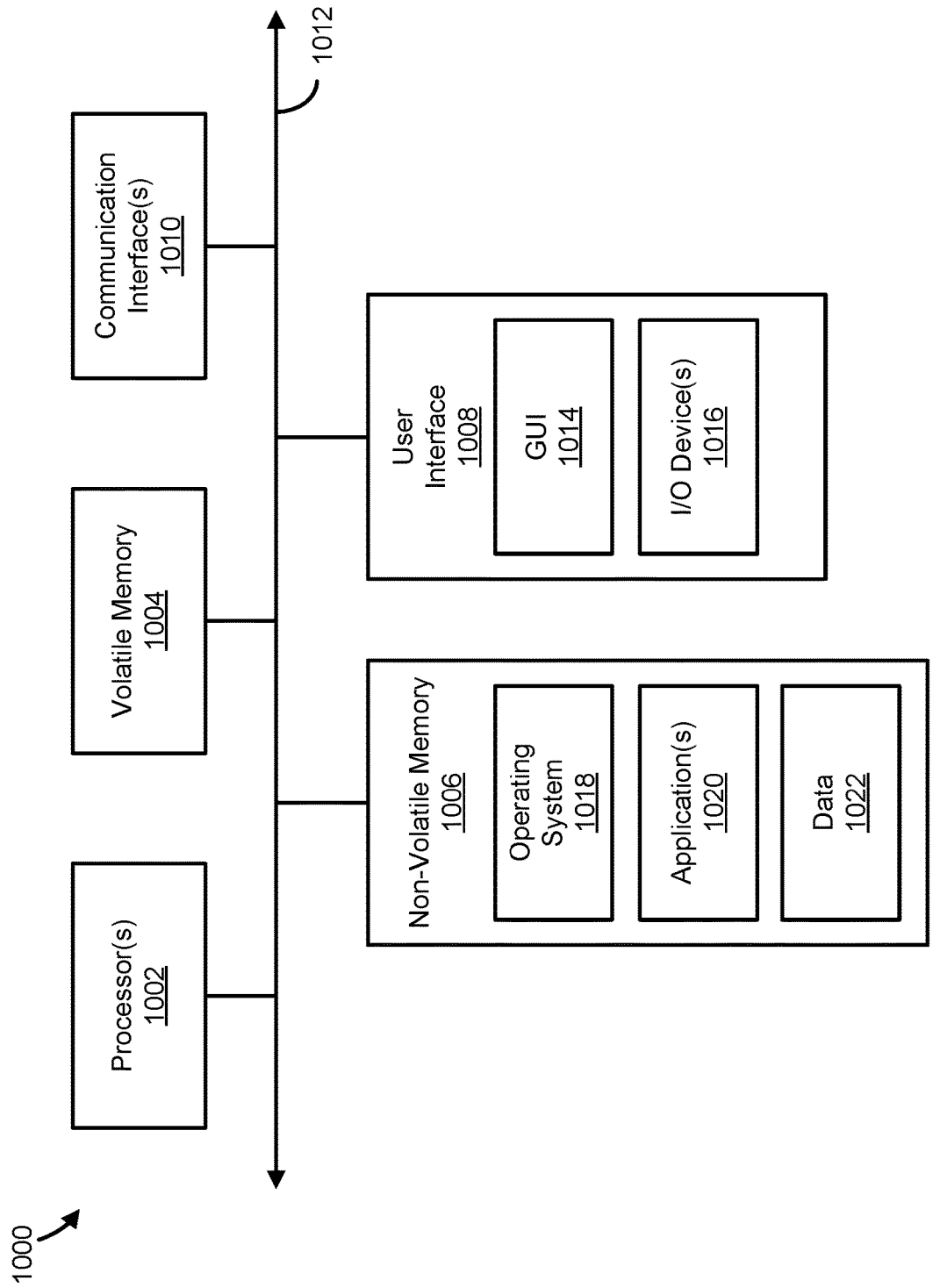
FIG. 10 is a block diagram of a computing device that can implement one or more of the computing devices of FIG. 9, in accordance with at least one example of the present disclosure.

FIG. 10 depicts a block diagram of a computing device 1000 useful for practicing an example of client devices 902, appliances 908 and/or servers 906. The computing device 1000 includes one or more processors 1002, volatile memory 1004 (e.g., random access memory (RAM)), non-volatile memory 1006, user interface (UI) 1008, one or more communications interfaces 1010, and a communications bus 1012. One or more of the computing devices 1000 may also be referred to as a computer system. In certain implementations, computing device 1000 can be used to practice an example of one client device 102 and/or remote computing device 104 as shown in FIG. 1 and described above.

The non-volatile memory 1006 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1008 can include a graphical user interface (GUI) 1014 (e.g., a touchscreen, a display, etc.) and one or more input/output (I/O) devices 1016 (e.g., a mouse, a keyboard, a microphone, one or more speakers, one or more cameras, one or more biometric scanners, one or more environmental sensors, and one or more accelerometers, etc.).

The non-volatile memory 1006 can store an operating system 1018, one or more applications 1020, and data 1022 such that, for example, computer instructions of the operating system 1018 and/or the applications 1020 are executed by processor(s) 1002 out of the volatile memory 1004. In some examples, the volatile memory 1004 can include one or more types of RAM and/or a cache memory that can offer a faster response time than a main memory. Data can be entered using an input device of the GUI 1014 or received from the I/O device(s) 1016. Various elements of the computing device 1000 can communicate via the communications bus 10.

The illustrated computing device 1000 is shown merely as an example client device or server and can be implemented by any computing or processing environment with any type of machine or set of machines that can have suitable hardware and/or software capable of operating as described herein.

The processor(s) 1002 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 1002 can be analog, digital or mixed. In some examples, the processor 1002 can include multiple processor cores and/or multiple processors configured to provide functionality for parallel, simultaneous execution of instructions or for parallel, simultaneous execution of one instruction on more than one piece of data.

The communications interfaces 1010 can include one or more interfaces to enable the computing device 1000 to access a computer network such as a Local Area Network (LAN), a Wide Area Network (WAN), a Personal Area Network (PAN), or the Internet through a variety of wired and/or wireless connections, including cellular connections.

In described examples, the computing device 1000 can execute an application on behalf of a user of a client device. For example, the computing device 1000 can execute one or more virtual machines managed by a hypervisor. Each virtual machine can provide an execution session within which applications execute on behalf of a user or a client device, such as a hosted desktop session. The computing device 1000 can also execute a terminal services session to provide a distributed workspace environment. The computing device 1000 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A computer system for identifying individuals with a user-requested expertise related to one or more software applications, the system comprising:
   a memory;
   a network interface; and
   at least one processor coupled to the memory and the network interface and configured to
   receive, via the network interface, a user input from a user,
   extract one or more keywords from the user input,
   generate one or more search requests based upon the one or more keywords, each search request of the one or more search requests identifying at least one application programming interface (API) call configured to invoke at least one API function as exposed by a software application of the one or more software applications, transmit the one or more search requests to the one or more software applications, receive one or more search responses from the one or more software applications, determine, from the one or more search responses, a plurality of software application users and a set of evidence associated with each software application user of the plurality of software application users, each set of evidence including a listing of user interactions with each of the one or more software applications, aggregate the sets of evidence into an aggregated data set, configure the aggregated data set as an input to a machine learning classifier, input a set of initial evidence weightings into the machine learning classifier to generate a trained classifier, the set of initial evidence weightings comprising at least one weight parameter for the set of evidence, input the aggregated data set into the trained classifier, and receive a ranked listing of the plurality of software application users from the trained classifier, the ranked listing generated by the trained classifier based upon the aggregated data set.

2. The computer system of claim 1, wherein the at least one processor is further configured to:

process the ranked listing to produce a personalized response to the user input; and transmit, via the network interface, the personalized response to the user.

3. The computer system of claim 2, wherein the at least one processor is further configured to:

receive user feedback from the user regarding the personalized response, the user feedback comprising a user feedback score of one or more of the plurality of software application users included in the personalized response;

generate an updated set of evidence weightings based upon the user feedback; and store the updated set of evidence weightings.

4. The computer system of claim 3, wherein the at least one processor is further configured to:

receive an updated user input from the user;

generate an updated aggregated data set based upon the updated user input;

input the updated set of evidence weightings into the trained classifier to generate a retrained classifier;

input the updated aggregated data set into the retrained classifier; and receive an updated ranked listing of the plurality of software application users from the retrained classifier, the updated ranked listing generated by the retrained classifier based upon the updated aggregated data set.

5. The computer system of claim 2, wherein the at least one processor is further configured to:

monitor user telemetry data indicative of one or more interactions between the user and the personalized response;

generate an updated set of evidence weightings based upon the user telemetry data; and store the updated set of evidence weightings.

6. The computer system of claim 5, wherein the at least one processor is further configured to:

receive an updated user input from the user;

generate an updated aggregated data set based upon the updated user input;

input the updated aggregated data set and the updated set of evidence weightings into the trained classifier; and receive an updated ranked listing of the plurality of software application users from the trained classifier, the updated ranked listing generated by the trained classifier based upon the updated aggregated data set and the updated set of evidence weightings.

7. The computer system of claim 1, wherein each of the listing of user interactions includes information related to the one or more keywords.

8. The computer system of claim 1, wherein the one or more software applications comprise at least one of an email application, a chat application, a messaging application, a community forum application, a code generation and/or review application, an accounting application, and a word processing application.

9. A method of identifying individuals with a user-requested expertise related to one or more software applications, the method comprising:

receiving, by at least one processor, a user input from a user;

extracting, by the at least one processor, one or more keywords from the user input;

generating, by the at least one processor, one or more search requests based upon the one or more keywords, each search request of the one or more search requests identifying at least one application programming interface (API) call configured to invoke at least one API function as exposed by a software application of the one or more software applications;

transmitting, by the at least one processor, the one or more search requests to the one or more software applications;

receiving, by the at least one processor, one or more search responses from the one or more software applications;

determining, by the at least one processor, a plurality of software application users and a set of evidence associated with each software application user of the plurality of software application users from the one or more search responses, each set of evidence including a listing of user interactions with each of the one or more software applications;

aggregating, by the at least one processor, the sets of evidence into an aggregated data set;

configuring, by the at least one processor, the aggregated data set as an input to a machine learning classifier;

inputting, by the at least one processor, a set of initial evidence weightings into the machine learning classifier to generate a trained classifier, the set of initial evidence weightings comprising at least one weight parameter for the set of evidence, inputting, by the at least one processor, the aggregated data set into the trained classifier; and receiving, by the at least one processor, a ranked listing of the plurality of software application users from the trained classifier, the ranked listing generated by the trained classifier based upon the aggregated data set.

10. The method of claim 9, further comprising:

processing, by the at least one processor, the ranked listing to produce a personalized response to the user input; and transmitting, by the at least one processor, the personalized response to the user.

11. The method of claim 10, further comprising:

receiving, by the at least one processor, user feedback from the user regarding the personalized response, the user feedback comprising a user feedback score of one or more of the plurality of software application users included in the personalized response;

generating, by the at least one processor, an updated set of evidence weightings based upon the user feedback;

inputting, by the at least one processor, the updated set of evidence weightings into the trained classifier to generate a retrained classifier;

receiving, by the at least one processor, an updated user input from the user;

generating, by the at least one processor, an updated aggregated data set based upon the updated user input;

inputting, by the at least one processor, the updated aggregated data set into the retrained classifier; and receiving, by the at least one processor, an updated ranked listing of the plurality of software application users from the retrained classifier, the updated ranked listing generated by the retrained classifier based upon the updated aggregated data set.

12. The method of claim 10, further comprising:

monitoring, by the at least one processor, user telemetry data indicative of one or more interactions between the user and the personalized response;

generating, by the at least one processor, an updated set of evidence weightings based upon the user telemetry data;

storing, by the at least one processor, the updated set of evidence weightings;

receiving, by the at least one processor, an updated user input from the user;

generating, by the at least one processor, an updated aggregated data set based upon the updated user input;

inputting, by the at least one processor, the updated aggregated data set and the updated set of evidence weightings into the trained classifier; and receiving, by the at least one processor, an updated ranked listing of the plurality of software application users from the trained classifier, the updated ranked listing generated by the trained classifier based upon the updated aggregated data set and the updated set of evidence weightings.

13. The method of claim 9, wherein each of the listing of user interactions includes information related to the one or more keywords.

14. A non-transitory computer readable medium storing computer executable instructions to identify individuals with a user-requested expertise related to one or more software applications, the computer executable instructions comprising instructions to:

receive a user input from a user;

extract one or more keywords from the user input;

generate one or more search requests based upon the one or more keywords, each search request of the one or more search requests identifying at least one application programming interface (API) call configured to invoke at least one API function as exposed by a software application of the one or more software applications;

transmit the one or more search requests to the one or more software applications;

receive one or more search responses from the one or more software applications;

determine, from the one or more search responses, a plurality of software application users and a set of evidence associated with each software application user of the plurality of software application users, each set of evidence including a listing of user interactions with each of the one or more software applications;

aggregate the sets of evidence into an aggregated data set;

configure the aggregated data set as an input to a machine learning classifier;

input a set of initial evidence weightings to the machine learning classifier to generate a trained classifier, the set of initial evidence weightings comprising at least one weight parameter for the set of evidence, input the aggregated data set into the trained classifier; and receive a ranked listing of the plurality of software application users from the trained classifier, the ranked listing generated by the trained classifier based upon the aggregated data set.

15. The computer readable medium of claim 14, wherein the instructions further comprise instructions to:

process the ranked listing to produce a personalized response to the user input; and transmit the personalized response to the user.

16. The computer readable medium of claim 15, wherein the instructions further comprise instructions to:

receive user feedback from the user regarding the personalized response, the user feedback comprising a user feedback score of one or more of the plurality of software application users included in the personalized response;

generate an updated set of evidence weightings based upon the user feedback;

input the updated set of evidence weightings into the trained classifier to generate a retrained classifier;

receive an updated user input from the user;

generate an updated aggregated data set based upon the updated user input;

input the updated aggregated data set into the retrained classifier; and receive an updated ranked listing of the plurality of software application users from the retrained classifier, the updated ranked listing generated by the retrained classifier based upon the updated aggregated data set.

17. The computer readable medium of claim 15, wherein the instructions further comprise instructions to:

monitor user telemetry data indicative of one or more interactions between the user and the personalized response;

generate an updated set of evidence weightings based upon the user telemetry data;

store the updated set of evidence weightings;

receive an updated user input from the user;

generate an updated aggregated data set based upon the updated user input;

input the updated aggregated data set and the updated set of evidence weightings into the trained classifier; and receive an updated ranked listing of the plurality of software application users from the trained classifier, the updated ranked listing generated by the trained classifier based upon the updated aggregated data set and the updated set of evidence weightings.

18. The computer readable medium of claim 14, wherein each of the listing of user interactions includes information related to the one or more keywords.

19. The computer readable medium of claim 14, wherein the set of initial evidence weightings is selected based upon the one or more keywords.

20. The computer system of claim 1, wherein the set of initial evidence weightings is selected based upon the one or more keywords.

21. The method of claim 9, further comprising selecting the set of initial evidence weightings based upon the one or more keywords.

\* \* \* \* \*